US010806276B1

(12) United States Patent
Chargois

(10) Patent No.: US 10,806,276 B1
(45) Date of Patent: Oct. 20, 2020

(54) INTEGRATED CONTAINER-SUSPENSION SYSTEM

(71) Applicant: THE BANANA BUNGEE LLC, Katy, TX (US)

(72) Inventor: Trevor A. Chargois, Katy, TX (US)

(73) Assignee: THE BANANA BUNGEE LLC, Katy, TX (US)

( * ) Notice: Subject to any disclaimer, the term of this patent is extended or adjusted under 35 U.S.C. 154(b) by 0 days.

(21) Appl. No.: 16/288,134

(22) Filed: Feb. 28, 2019

Related U.S. Application Data

(63) Continuation-in-part of application No. 15/370,489, filed on Dec. 6, 2016.

(60) Provisional application No. 62/268,437, filed on Dec. 16, 2015.

(51) Int. Cl.
*A47F 7/00* (2006.01)
*A47J 47/16* (2006.01)

(52) U.S. Cl.
CPC ............ *A47F 7/0071* (2013.01); *A47J 47/16* (2013.01)

(58) Field of Classification Search
CPC .... A47F 7/0078; A47F 7/0071; A47F 5/0006; A45F 2005/006; A45F 2005/1013; A47J 47/16; A47G 19/30
See application file for complete search history.

(56) References Cited

U.S. PATENT DOCUMENTS

| | | | |
|---|---|---|---|
| 725,458 A | 4/1903 | Levy | |
| 903,067 A | 11/1908 | Engman | |
| 911,508 A | 2/1909 | Look | |
| 934,808 A | 9/1909 | Hiss | |
| 977,071 A * | 11/1910 | Crandall | ............... A47G 19/30 211/85.4 |
| 1,078,804 A * | 11/1913 | Royse | ................... A47G 19/30 211/85.4 |
| 1,211,926 A | 1/1917 | Dodd | |
| 1,505,539 A * | 8/1924 | Burke | ................. A47F 7/0071 248/127 |
| 1,715,603 A * | 6/1929 | Kamman | ................. A47F 5/01 211/85.4 |
| 1,788,082 A * | 1/1931 | Byrnes | ................... A47J 47/16 206/756 |
| 1,795,779 A | 3/1931 | Kennedy | |
| 1,807,500 A * | 5/1931 | West | .................... A47B 23/007 108/8 |
| 1,972,505 A | 9/1934 | Wilson | |
| 2,038,903 A | 4/1936 | Rakatzky | |
| 2,245,126 A | 6/1941 | Day | |
| 2,325,703 A * | 8/1943 | Nute | ........................ A62C 3/06 220/88.1 |
| 2,362,137 A | 11/1944 | Kagan | |
| 2,764,305 A | 9/1956 | Reich | |

(Continued)

FOREIGN PATENT DOCUMENTS

CH 317395 A * 11/1956 ............. A47J 47/16
JP 2006296222 A * 11/2006

*Primary Examiner* — Stanton L Krycinski

(57) ABSTRACT

Disclosed is a fresh fruit storage and display system that enables the storage of bananas and other fruit in a manner that does not result in damage to the bananas (e.g., bruising, aging, etc.) stemming from contact with other fruit or exposure to ethylene gas emitted by the other fruit, and featuring a dynamic suspension component for enhanced suspended storage (without piercing) of a hand of bananas and/or a single banana.

17 Claims, 14 Drawing Sheets

(56) References Cited

U.S. PATENT DOCUMENTS

| | | | | |
|---|---|---|---|---|
| 3,709,373 | A | * | 1/1973 | Aguilar .............. A47F 5/0892 211/113 |
| 4,141,529 | A | | 2/1979 | Casutt |
| 4,242,813 | A | * | 1/1981 | Quance .............. A63C 11/023 12/120.5 |
| D278,456 | S | * | 4/1985 | Lewis .................... 224/103 |
| 4,523,357 | A | | 6/1985 | Widditsch |
| 5,351,346 | A | * | 10/1994 | Hodges, Jr. .......... A47K 3/281 211/113 |
| 5,364,053 | A | | 11/1994 | Rodgers |
| D354,429 | S | | 1/1995 | McNaughton |
| 5,396,993 | A | * | 3/1995 | Spitler .................. A47J 47/16 211/41.2 |
| D361,472 | S | | 8/1995 | Heilicher |
| 5,474,188 | A | * | 12/1995 | McArdle .............. A47F 7/0071 211/85.4 |
| D367,153 | S | * | 2/1996 | Sturm .................... D6/674 |
| D369,482 | S | | 5/1996 | McArdle |
| 5,771,790 | A | * | 6/1998 | Barrows ................ A23B 7/144 211/113 |
| 5,826,843 | A | | 10/1998 | Sturm |
| 5,853,213 | A | * | 12/1998 | Simpson .............. A45F 5/10 294/158 |
| 5,873,616 | A | * | 2/1999 | Kirschbaum .......... A45F 5/10 294/150 |
| 5,979,673 | A | * | 11/1999 | Dooley ................ A47J 47/16 211/41.11 |
| D430,791 | S | | 9/2000 | Hook et al. |
| 6,145,170 | A | | 11/2000 | Bernard et al. |
| 6,161,703 | A | | 12/2000 | Mihok |
| 6,164,616 | A | | 12/2000 | Woods et al. |
| 6,416,026 | B1 | | 7/2002 | Porraro |
| 6,425,167 | B1 | * | 7/2002 | Barbarite ............ A47G 25/00 24/298 |
| 6,604,320 | B1 | | 8/2003 | Hsia |
| 6,682,032 | B1 | | 1/2004 | Bradlee |
| 6,854,609 | B1 | | 2/2005 | Hettinger |
| 7,152,367 | B2 | | 12/2006 | Mastronardi |
| 7,311,289 | B2 | | 12/2007 | Mori |
| D586,624 | S | | 2/2009 | Goodman et al. |
| 7,563,047 | B2 | * | 7/2009 | Paluda ................ B43K 23/001 401/131 |
| 7,757,996 | B2 | | 7/2010 | Jacobs |
| D624,393 | S | | 9/2010 | Frey |
| 7,798,056 | B2 | | 9/2010 | Kramer |
| D637,403 | S | | 5/2011 | Schmidt |
| D648,184 | S | * | 11/2011 | Goodman ................ D7/601 |
| 8,191,849 | B1 | | 6/2012 | Lembke |
| D671,371 | S | * | 11/2012 | Goodman ................ D7/601 |
| 8,783,628 | B2 | | 7/2014 | Jette |
| 9,756,985 | B2 | * | 9/2017 | Knight, Sr. .......... A47J 47/16 |
| 10,149,556 | B2 | * | 12/2018 | Fischer ................ F16M 11/22 |
| 2004/0124323 | A1 | | 7/2004 | Kamenstein |
| 2008/0264884 | A1 | | 10/2008 | Felder |
| 2011/0198462 | A1 | * | 8/2011 | Pell ...................... A47J 47/16 248/206.2 |
| 2013/0185900 | A1 | * | 7/2013 | Campbell ............ F16G 11/101 24/301 |
| 2013/0232732 | A1 | | 9/2013 | Jacobson et al. |
| 2014/0262921 | A1 | * | 9/2014 | Muller .................. A47J 47/16 206/553 |
| 2015/0296979 | A1 | * | 10/2015 | Todd .................... A47B 75/00 211/85.4 |
| 2015/0327674 | A1 | | 11/2015 | Stevens |
| 2016/0367026 | A1 | * | 12/2016 | Hall .................... A47J 47/16 |

* cited by examiner

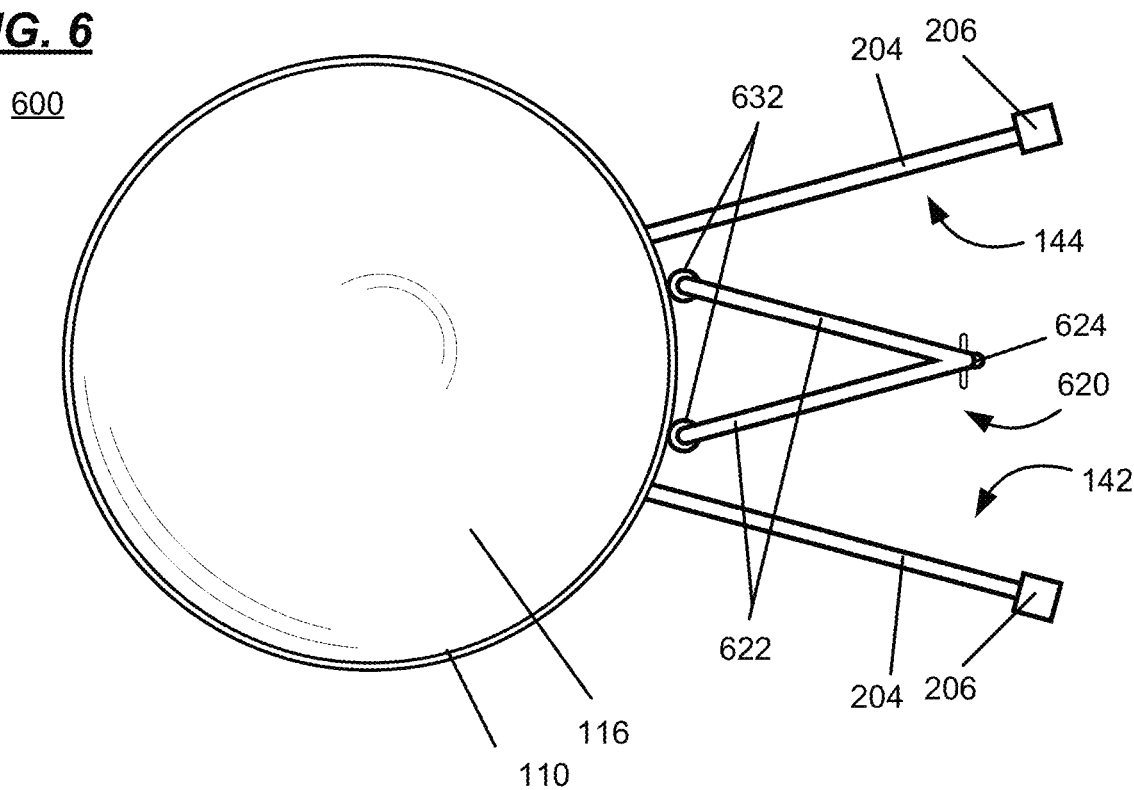
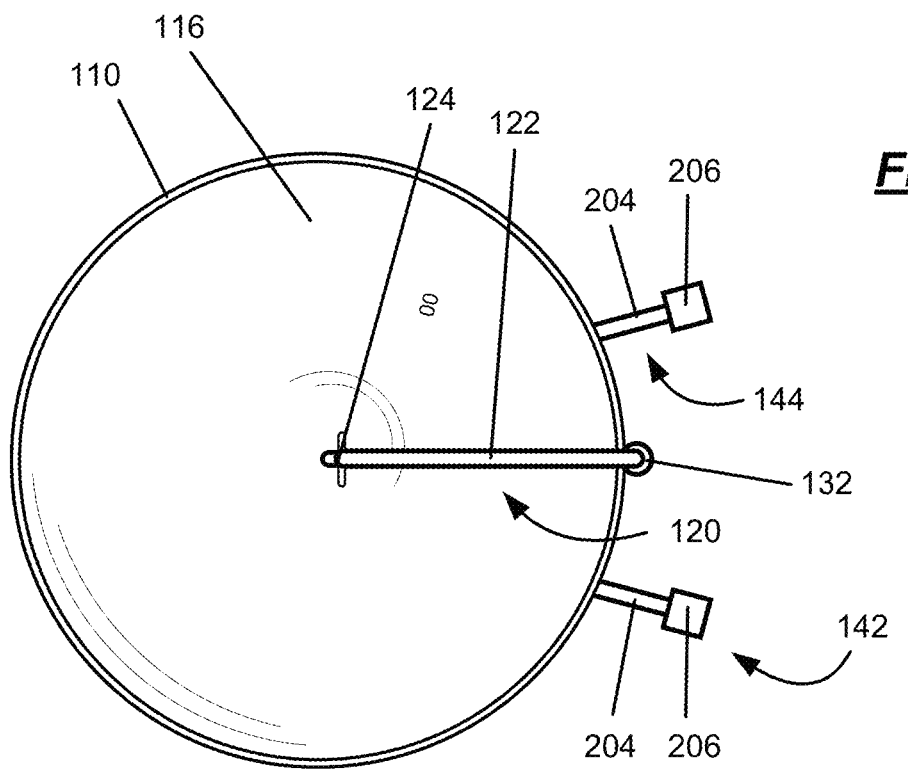

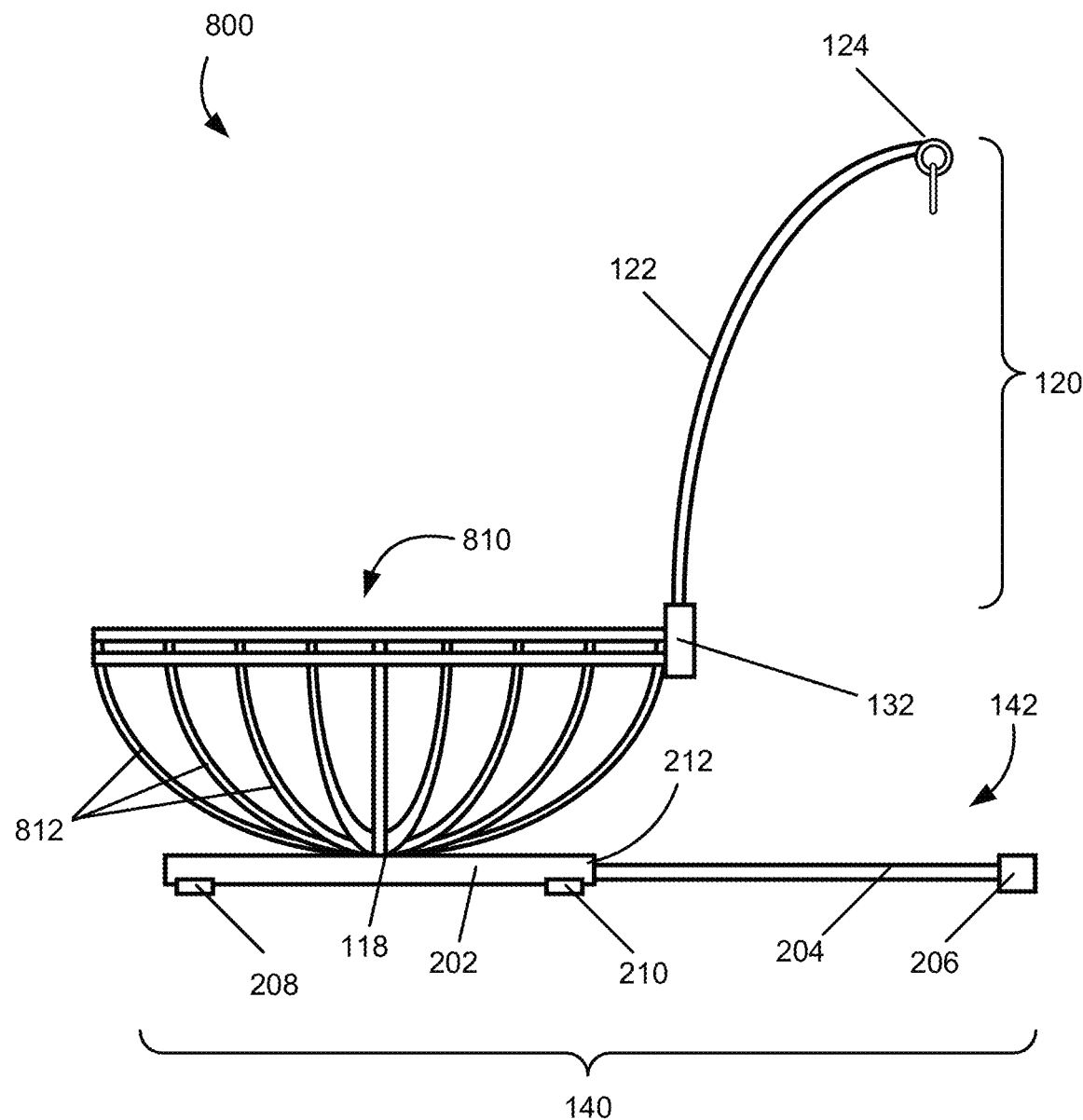

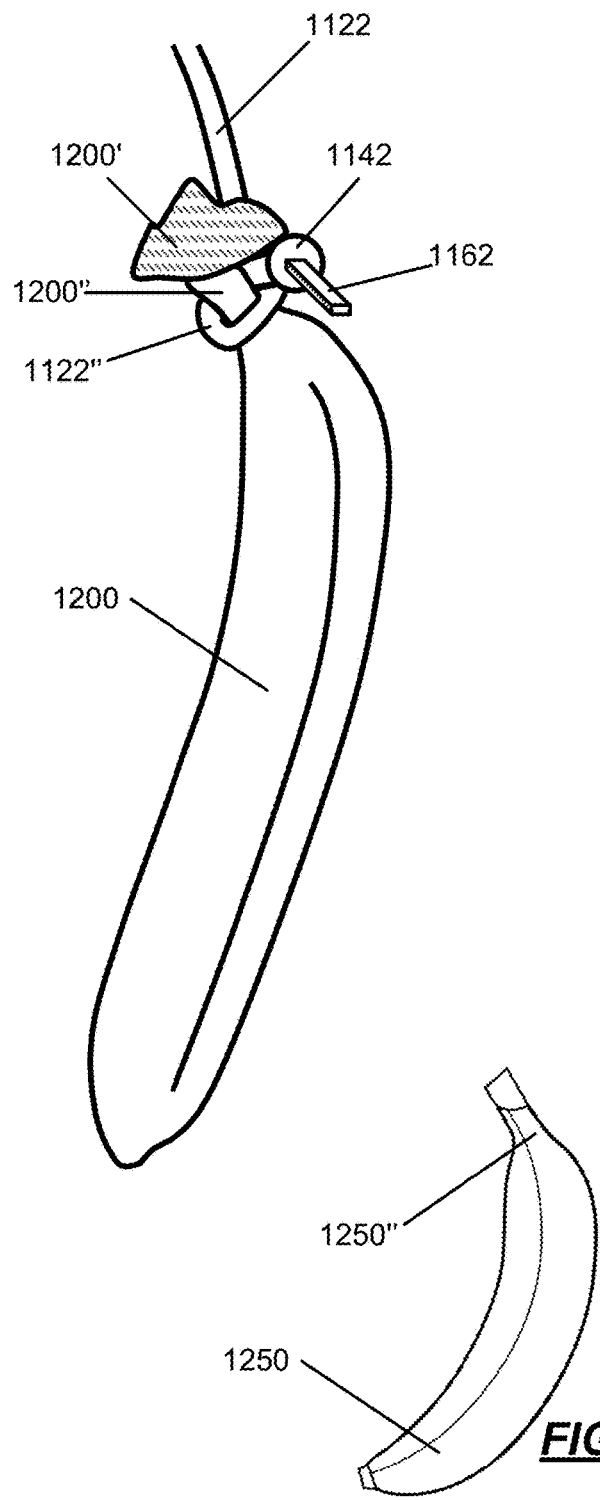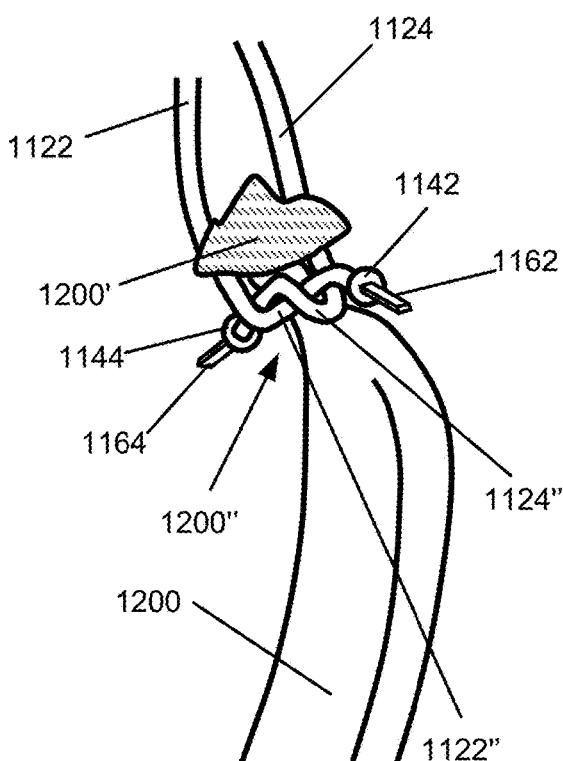
*FIG. 12A*
*FIG. 12B*
*FIG. 12C*

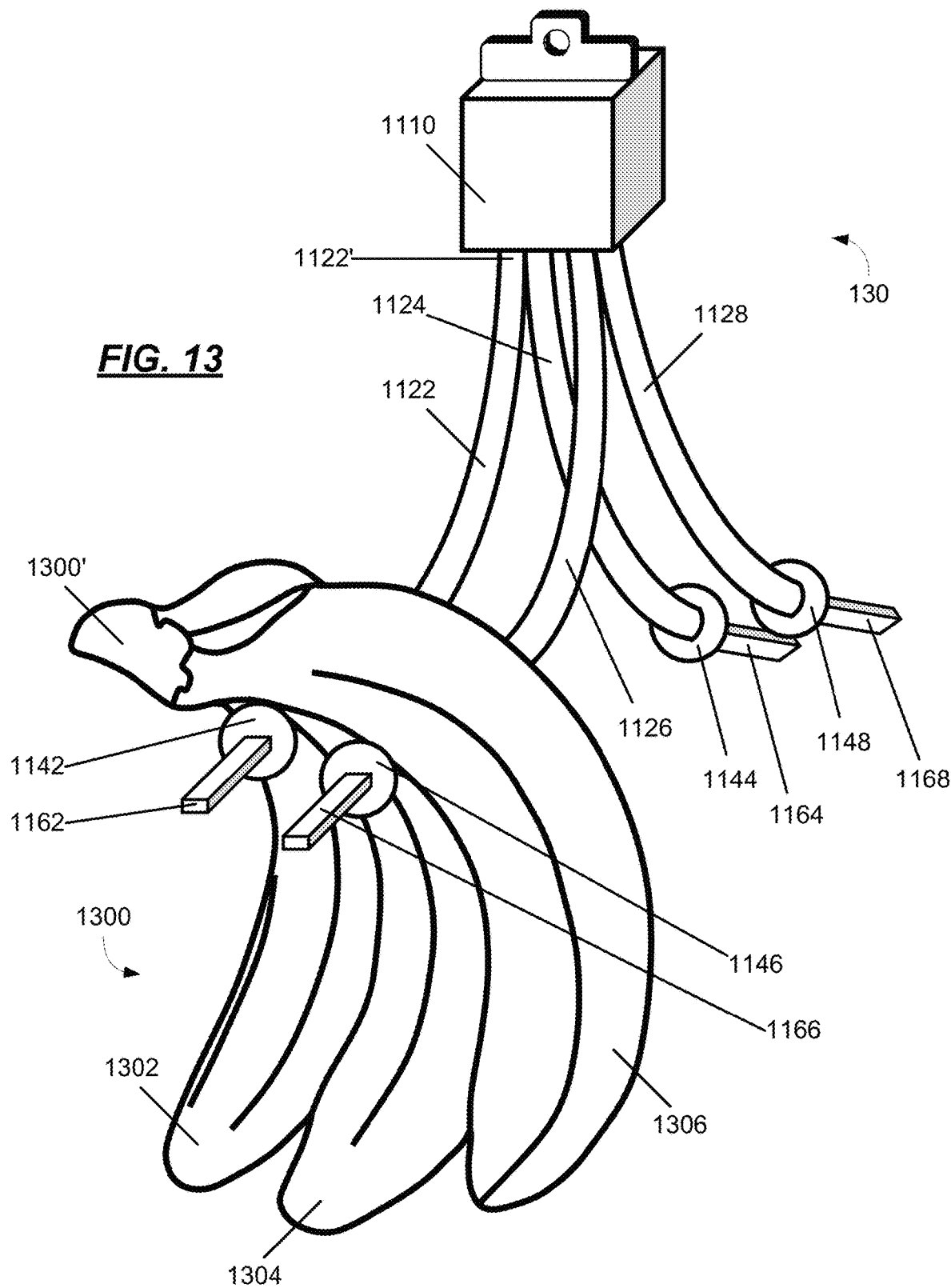

INTEGRATED CONTAINER-SUSPENSION SYSTEM

CROSS-REFERENCE TO RELATED APPLICATIONS

This application is a continuation-in-part of, claims benefit of and priority to, and incorporates herein by reference in its entirety U.S. patent application Ser. No. 15/370,489, filed Dec. 6, 2016, titled "DYNAMIC NON-PIERCING TACTILE AND MANIPULABLE SUSPENSION SYSTEM", which in turn claims benefit and priority to U.S. Provisional Application No. 62/268,437, filed Dec. 16, 2015, titled "AN APPARATUS FOR SUSPENDING A HAND OF BANANAS".

BACKGROUND

Domesticated bananas (or "plantains") are edible fruits that have an easily recognizable elongated and curved form with a soft inner flesh that is rich in starch and covered with a rind (or "peel"). Banana fruit grows in clusters typically hanging from upper regions of the banana plant. The banana fruits develop from female flowers into large hanging clusters made up of tiers of "hands" of fruit. A cluster generally comprises up to twenty fruit per tier. The hanging cluster is known as a "bunch," and a bunch generally comprises three to twenty hands. An individual banana fruit is commonly referred to simply as a "banana" or a "finger." As used herein, the term "hand" may also be used to refer to any subset of bananas from a tier attached to each other at the stems (as opposed to individual bananas that are not attached to each other at the stem, each of which is still a "finger" but collectively, without being attached to each other at the stem, do not constitute a "hand").

Storing bananas along with other fruit is a challenge for a variety of different reasons. For example, bananas bruise easily when they are mishandled by consumers. Limited are the number of designs that minimize the effects of improper handling of bananas. Bananas also bruise easily when they come into contact with external surfaces, and thus storing bananas on top of or among other fruit in a bowl can cause bruising on the bananas where contact is made with such other fruit. For this reason many solutions to banana storage employ some sort of suspension system where a hand of bananas is suspended in a manner intended to minimize (if not completely avoid) contact with external surfaces including other fruit. One such common design incorporates a suspension system integrated with a bowl structure such that bananas are suspended above other fruit contained in the bowl structure.

However, while such "bowl-plus-suspension" container-suspension system designs have certain advantages—such as an inherent degree of vertical stability while maintaining a minimum countertop footprint—a distinct disadvantage of this design is that other fruits, such as apples and pears, can accelerate the ripening and spoilage of bananas when stored in close proximity to bananas due to the emission of ethylene gas. In these other fruits, ethylene gas acts as a hormone that regulates plant growth and development, and particularly the speed at which fruit ripening occurs. Stated differently, ethylene is essentially an aging hormone for plants. Furthermore, certain fruits—such as apples and pears—emit a greater amount of ethylene gas than other fruits. Regardless, the ethylene emissions of other fruit not only affects their own ripening but also the ripening of other fruit in close proximity, including bananas. Moreover, because ethylene gas is "lighter than air," a flow of ethylene will rise up and encompass bananas or other fruit (such as grapes, etc.) suspended directly above such ethylene-emitting fruit absent sufficient air circulation to direct the ethylene gas away from bananas or other fruit suspended above the bowl.

Another disadvantage of such bowl-plus-suspension designs is that the banana suspension component typically utilizes a rigid smooth metal hook that either (a) slips between the fingers in a hand and engages the stem structure to which all fingers in the hand are interconnected or (b) pierces the stem structure (or one of the bananas) to maintain contact between the hook and the bunch. However, hook-based approaches have several shortcomings, chief among them being: (1) a rigid and inflexible design that necessitates higher levels of physically forceful manipulation, twisting, gripping, torque, and other potentially-damaging handling to set a hand of bananas in place; and (2) the inability to suspend a single banana without piercing some part of the banana or stem structure (which requires a sharp-tipped hook). Hook-based structures also generally are unable to support more than one hand of bananas at a time. Certain hook-based structures—especially those with a sharp tip for piercing a banana—may pose a safety hazard to the fingers and hands of human handlers, may snag clothing, and may become breeding grounds for bacteria and other microbes growing in residue remaining on the hook after piercing any part of a banana hand.

While there are some existing container-suspension systems that do not utilize a hook, many of these systems still suffer shortcomings in, among other issues, the limited number of hands that typically can be suspended, the inability to distribute weight among more than one suspension point for a single hand or bunch of fruit, and/or the inability to suspend a single banana particularly where that single banana lacks a complex stem (which may also be referred to herein as lacking a "complex stem end").

For these several reasons, there is a need for an improved container-suspension system that enables the storage of bananas and other fruit in a manner that does not result in damage to bananas (e.g., bruising, aging, etc.) stemming from excessive physical handling, contact with other fruit, and/or exposure to ethylene gas emitted by other fruit in close proximity. There is also a need for certain such systems to utilize a dynamic non-piercing suspension component for enhanced banana storage.

SUMMARY

Disclosed herein are various implementations (to include example constructions or embodiments). These include implementations directed to integrated container-suspension systems for storing fruit including but not limited to bananas, both in hands and individually, as well as grapes and other fruits and/or vegetables that are hangable as well as yet other fruit that is suitably stored in a bowl-like container or other receptacle. As used herein, the term "fruit" encompasses all potentially edible plant organic matter including without limitation both fruits and vegetables.

More specifically, various implementations disclosed herein may comprise a receptacle capable of containing a plurality of items (e.g., fruit); a base coupled to the receptacle for stable placement of the container-suspension system on a flat surface (such as a kitchen counter); and a vertical extension coupled to the receptacle, the base, or both and capable of suspending at least one item (such as a hand of bananas) in a position other than directly above the receptacle. Several such implementations may further feature a vertical extension capable of suspending at least one item to a first side of the receptacle; at least two base legs that are oriented in a manner to provide stable placement of the container-suspension system on a flat surface when the extension is suspending the at least one item and when the receptacle is empty; base legs that further comprise a fixed component fixedly coupled to the receptacle; and a movable component operationally coupled to the fixed component that in a first position relative to the fixed component provides a minimum leg length and in a second position relative to the fixed component provides a maximum leg length, the maximum leg length being greater than the minimum leg length; a mirrored extension coupled to the receptacle, the base, or both, wherein said mirrored extension is capable of suspending at least one item in a position other than directly above the receptacle; and/or a configuration where the plurality of legs are confined beneath and within the lateral circumference of the receptacle when each leg from among the at least two base legs is in the first position and the plurality of legs extend beyond the lateral circumference of the receptacle when each leg from among the at least two base legs is in the second position, such that a suspension center of gravity for the item suspended by the vertical extension lies within a support footprint provided by the at least two base legs when each leg from among the at least two base legs is in the second position.

For several such implementations, the movable component of each leg of the at least two base legs in a third position relative to the fixed component provides an intermediate leg length less than the maximum leg length and greater than the minimum leg length such that an unloaded center of gravity for the apparatus, when the receptacle and vertical extension are not utilized, lies within a support footprint provided by the at least two base legs when in the third position. For certain implementations the container-suspension system may comprise a mirrored extension coupled to the receptacle, the base, or both, wherein said mirrored extension is capable of suspending at least one item in a position other than directly above the receptacle, and for some such implementations the mirrored extension may be coupled to the receptacle, the base, or both in a manner opposite of the vertical extension such that, when a first item is suspended by the vertical extension and a second item of equal weight is suspended by the mirrored extension, the first item and second item cancel out each other with regard to the unloaded center of gravity. For certain alternative implementations, the vertical extension may be movably coupled to the receptacle, the base, or both, such that said vertical extension is capable of suspending at least one item in a position other than directly above the receptacle in a first orientation and is capable of suspending at least one item in a position directly above the receptacle in a second orientation and, for some such implementations, further comprises an oxidizer for neutralizing ethylene gas originating in the receptacle, e.g., when in this second orientation.

The various implementations disclosed herein may also feature a vertical extension that further comprises a suspension component, the suspension component comprising: one or more suspension strands, each suspension strand comprising a first end and a second end opposite the first end, the first end of each suspension strand operationally coupled to the vertical extension such that each suspension strand extends from the vertical extension; and one or more suspension contacts, each suspension contact coupled to the second end of a suspension strand from among the one or more suspension strands. In additional, several such implementations may be capable of suspending a hand of bananas in a first use without piercing the hand of bananas, as well as suspending a single banana in a second use without piercing the single banana. For certain implementations, multiple strands may simultaneously suspend a single hand of bananas, the suspended hand of bananas comprises at least three fingers, and at least one finger from among the at least three fingers is capable of being removed from the hand of bananas without repositioning at least one suspension strand and corresponding suspension contact which remains capable of suspending the hand of bananas after said removal. Additionally, a hand of bananas may be suspended by at least two suspension strands, where each suspension strand from among the at least two suspension strands bears a portion of a total suspension weight corresponding to the hand of bananas.

Various implementations disclosed herein are also directed to an apparatus comprising: a receptacle capable of containing a plurality of items; a base coupled to the receptacle for stable placement of the container-suspension system on a flat surface; a vertical extension coupled to the receptacle, the base, or both, wherein said vertical extension is capable of suspending at least one item in a position other than directly above the receptacle; and a suspension component operationally coupled to the vertical extension, the suspension component comprising: one or more suspension strands, each suspension strand comprising a first end and a second end opposite the first end, the first end of each suspension strand operationally coupled to the vertical extension such that each suspension strand extends from the vertical extension, and one or more suspension contacts, each suspension contact coupled to the second end of a suspension strand from among the one or more suspension strands, wherein each suspension strand and its coupled suspension contact are capable of suspending a hand of bananas in a first use without piercing the hand of bananas, and suspending a single banana in a second use without piercing the single banana. For several such implementations, the base may comprise at least two base legs that are oriented in a manner to provide stable placement of the container-suspension system on a flat surface when the extension is suspending the at least one item and when the receptacle is empty, and wherein each leg from among the at least two base legs further comprises a fixed component fixedly coupled to the receptacle and a movable component operationally coupled to the fixed component that in a first position relative to the fixed component provides a minimum leg length and in a second position relative to the fixed component provides a maximum leg length, the maximum leg length being greater than the minimum leg length. For certain such implementations, the vertical extension may be movably coupled to the receptacle, the base, or both, such that said vertical extension is capable of suspending at least one item in a position other than directly above the receptacle in a first orientation and is capable of suspending at least one item in a position directly above the receptacle in a second orientation.

Certain implementations disclosed herein are also directed to an apparatus comprising: a receptacle capable of containing a plurality of items; a vertical extension coupled to the receptacle wherein said vertical extension is capable of suspending at least one item in a position other than directly above the receptacle; a container-suspension system operational coupled to the vertical extension, the suspension component comprising one or more suspension strands, each suspension strand comprising a first end and a second end opposite the first end, the first end of each suspension strand operationally coupled to the vertical extension such that each suspension strand extends from the vertical extension, and one or more suspension contacts, each suspension contact coupled to the second end of a suspension strand from among the one or more suspension strands, each suspension strand and its coupled suspension contact being capable of suspending a hand of bananas in a first use without piercing the hand of bananas and suspending a single banana in a second use without piercing the single banana; and a base coupled to the receptacle for stable placement of the container-suspension system on a flat surface, the base comprising at least two base legs extending beyond the lateral circumference of the receptacle and for which a suspension center of gravity for an item suspended by the vertical extension lies within a support footprint provided by the at least two base legs.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary and the following detailed description of illustrative implementations are better understood when read in conjunction with the appended drawings. For the purpose of illustrating the implementations, shown in the drawings are example constructions of the implementations; however, the implementations are not limited to the specific methods and instrumentalities disclosed. In the drawings:

FIG. 6 is a top view of an exemplary container-suspension system featuring an alternative arrangement of the vertical extension that is representative of several implementations disclosed herein;

FIG. 7A is a top view of the exemplary container-suspension system of FIG. 1 featuring a reversible support arm structure in an in-bound position that is representative of certain implementations disclosed herein;

FIG. 8 is a side view of an exemplary container-suspension system featuring a wire-type receptacle, in lieu of the solid receptacle shown in FIG. 1, that is representative of several implementations disclosed herein;

FIG. 12A is a three-dimensional perspective view illustrating a single suspension strand of the exemplary suspension component of FIG. 11 being utilized to suspend a single banana in a manner representative of various implementations disclosed herein;

FIG. 12B is a three-dimensional perspective view illustrating a pair of suspension strands of the exemplary suspension component of FIG. 11 being utilized to suspend a single banana in a manner representative of various implementations disclosed herein;

FIG. 12C is a three-dimensional perspective view of a single banana finger that may also be suspended from the single suspension strand illustrated in FIG. 12A as well as from the pair of suspension strands illustrated in FIG. 12B, both in a manner representative of various implementations disclosed herein;

FIG. 13 is a three-dimensional perspective view of the exemplary dynamic TSS of FIG. 11 further illustrating a single hand of bananas suspended from two suspension strands representative of various implementations disclosed herein;

DETAILED DESCRIPTION

Disclosed herein is a fresh fruit storage and display system that enables the storage of bananas and other fruit in a manner that does not result in damage to the bananas (e.g., bruising, aging, etc.) stemming from contact with other fruit or exposure to ethylene gas emitted by the other fruit, and featuring a dynamic suspension component for enhanced suspended storage (without piercing) of a hand of bananas and/or a single banana. Various concepts helpful to more fully understand and appreciate these various implementations are herein described in support of the disclosures specifically pertaining to these various implementations that follow.

In summary, a container-suspension system comprises a receptacle (e.g., a bowl) capable of containing a plurality of items (e.g., fruit), a base coupled to the receptacle for stable placement of the container-suspension system on a flat surface, and a vertical extension coupled to the receptacle, the base, or both, wherein said vertical extension is capable of suspending at least one item in a position other than directly above the receptacle. This vertical extension may also feature a dynamic suspension component comprising one or more suspension strands, each suspension strand comprising a first end and a second end opposite the first end, the first end of each suspension strand coupled to the integration housing, and one or more suspension contacts, each suspension contact coupled to the second end of a suspension strand from among the one or more suspension strands, the suspension strand and coupled suspension contact being capable of suspending a hand of bananas in a first use without piercing the hand of bananas, and suspending a single banana in a second use without piercing the single banana.

Figure 1:
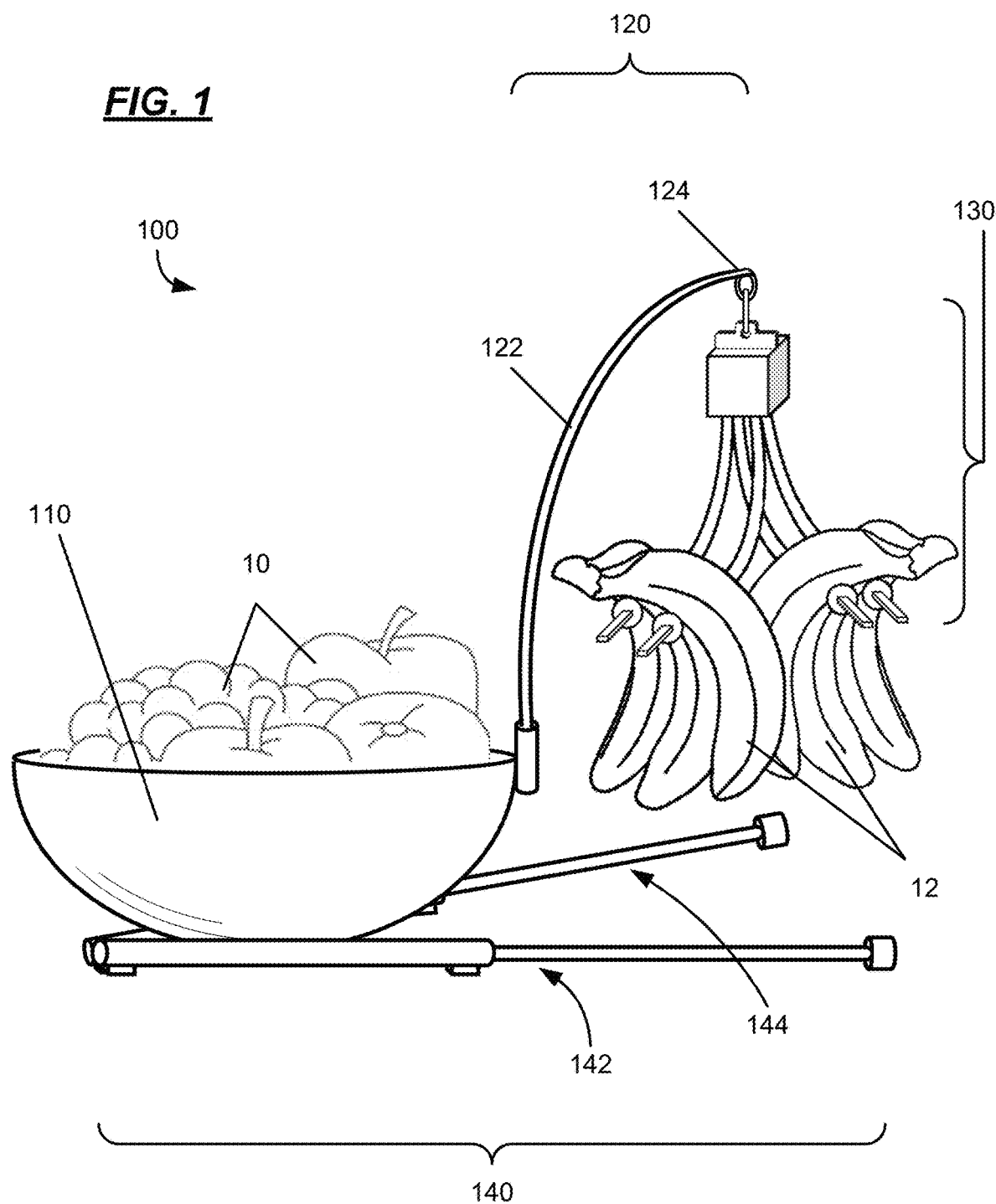
FIG. 1. is a three-dimensional perspective view of an exemplary container-suspension system (shown storing various items of fruit) representative of various implementations disclosed herein.
Figure 2:
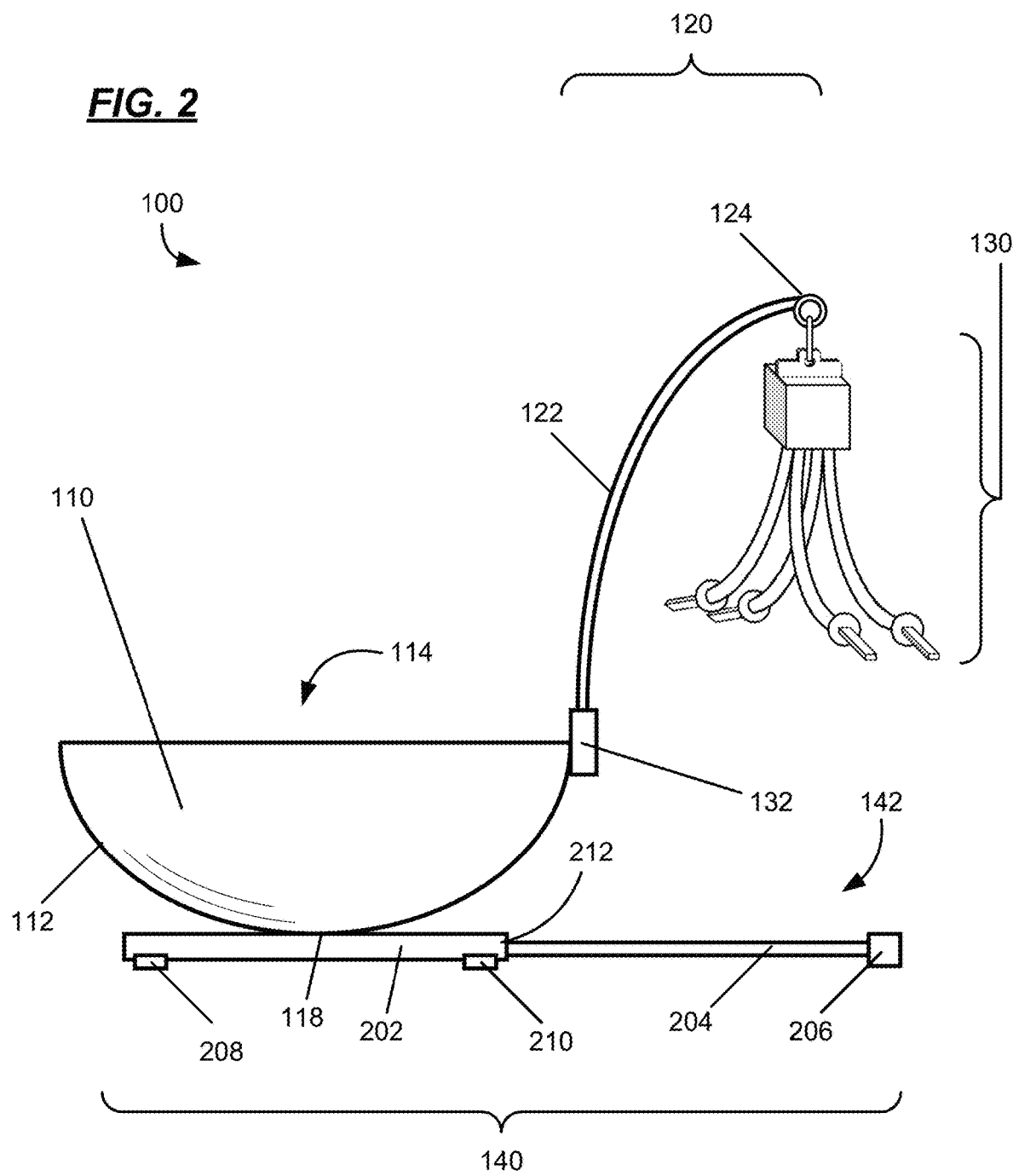
FIG. 2 is a side view of the exemplary container-suspension system of FIG. 1 representative of various implementations disclosed herein.
Figure 3:
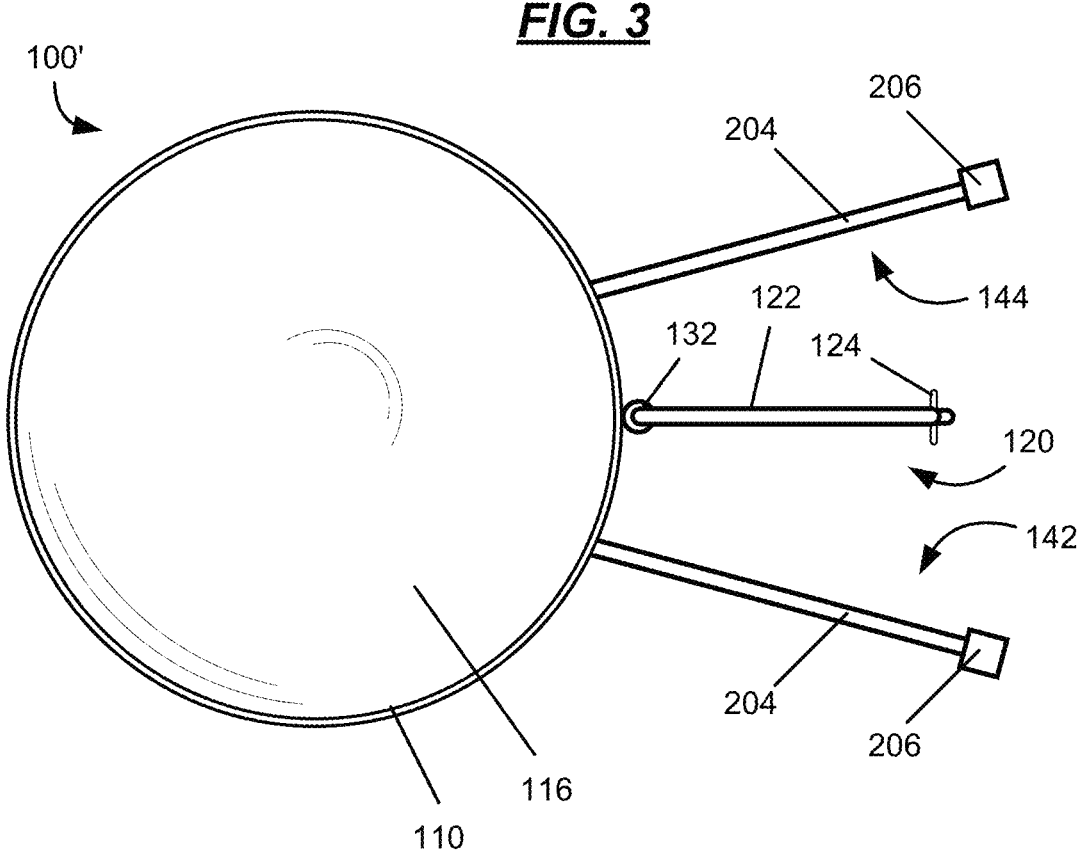
FIG. 3 is a top view of the exemplary container-suspension system of FIG. 1 without the suspension component being shown (for clarity in illustrating other components) representative of various implementations disclosed herein.
Figure 4:
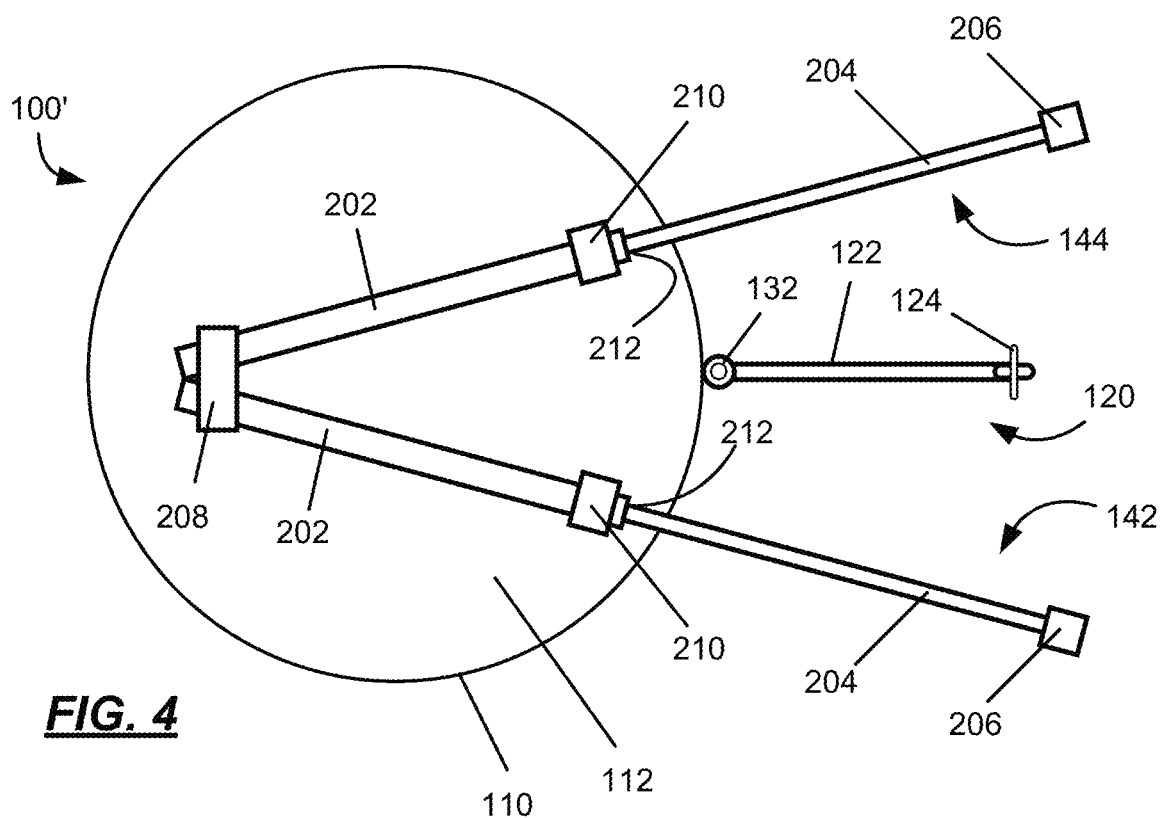
FIG. 4 is a bottom view of the exemplary container-suspension system of FIG. 1 without the suspension component being shown (for clarity in illustrating other components) representative of various implementations disclosed herein.

FIGS. 1-4 provide differing views of an exemplary implementation, each figure highlighting different features of said exemplary implementation. FIG. 1 is a three-dimensional perspective view of an exemplary container-suspension system 100 (shown storing and displaying various items of fruit 10 and 12) representative of various implementations disclosed herein. FIG. 2 is a side view of the exemplary container-suspension system 100 of FIG. 1 representative of various implementations disclosed herein. FIG. 3 is a top view 100' of the exemplary container-suspension system 100 of FIG. 1 without the suspension component 130 being shown (for clarity in illustrating other components) representative of various implementations disclosed herein. FIG. 4 is a bottom view 100" of the exemplary container-suspension system 100 of FIG. 1 without the suspension component 130 representative of various implementations disclosed herein being shown (for clarity in illustrating other components).

With regard to FIGS. 1-4, the container-suspension system 100 comprises receptacle 110 coupled to a base 140 and also coupled to a vertical extension 120. The receptacle 110 comprises an exterior surface 112 and an interior surface 116, the latter of which defines the storage area 114 for the receptacle 110 suitable for containing a plurality of items such as fruit (apples, oranges, pears, grapes, and so forth). As shown, the receptacle 110 may resemble a bowl shape having a concave interior surface 116 and a convex exterior surface 112, but other shapes and configurations are also possible such as, for example, boxes having a square, triangle, or other geometric shape, as well as multi-point stars, diamonds, and so forth. The receptacle may also have a cover (not shown) or other access features, and the implementations disclosed herein are in no way limited to any particular shape or configuration.

Figure 7B:
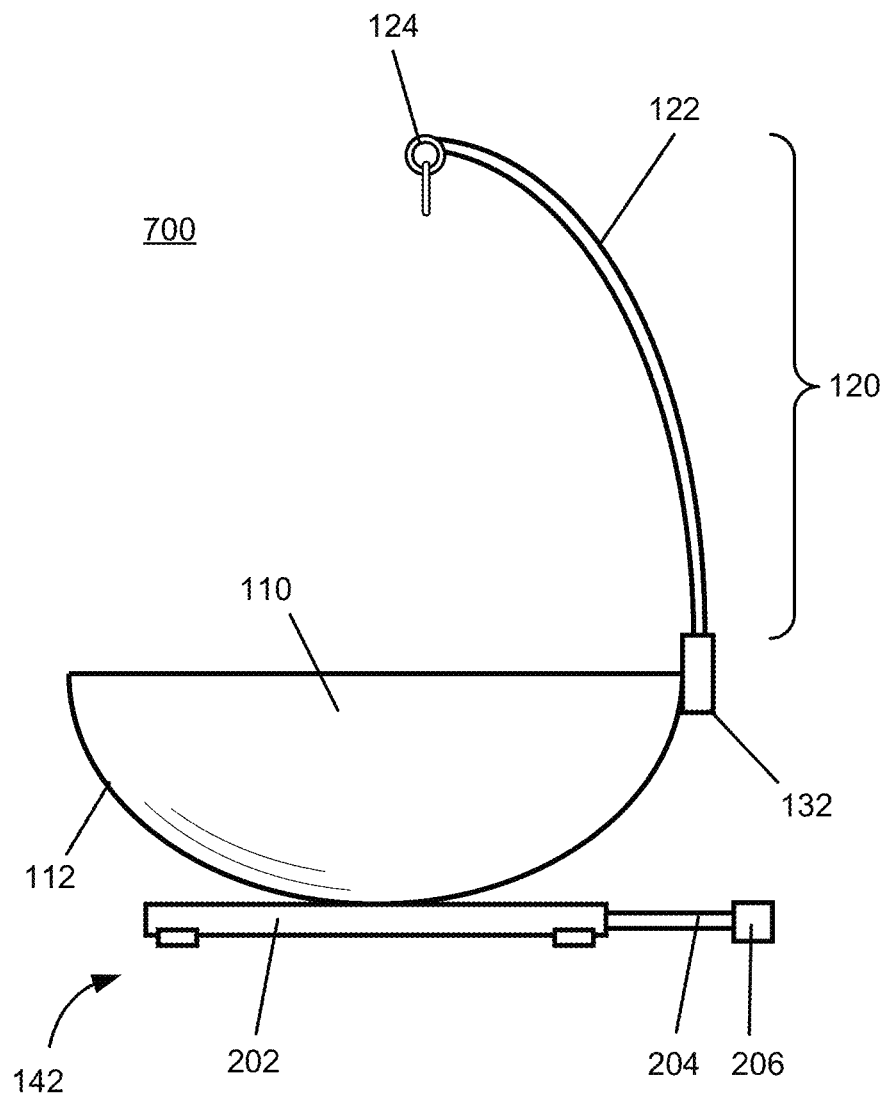
FIG. 7B is a side view of the exemplary container-suspension system of FIG. 7A illustrating the a reversible support arm structure in an in-bound position representative of certain implementations disclosed herein.

As further illustrated in FIGS. 1-4, the receptacle 110 is coupled at one or more coupling points 118 to a base 140 for stable placement of the container-suspension system 100 on a flat surface such as a table or kitchen counter for example. As shown, the base 140 comprises two legs 142, 144 that are oriented in a manner to provide stable placement of the container-suspension system 100 on a flat surface when the extension 120 is suspending an item (such as a hand of bananas) without tipping over even when the receptacle 110 is empty. Each leg 142, 144 comprises a fixed component 202 that may be fixedly coupled to the receptacle 110 and a movable component 204 operationally coupled to the fixed component 202. As shown, the fixed component 202 may be hollow and open at one end 212 and thereby enable the movable component 204 to slide into and reside substantially within the fixed component 202 (such as shown in FIGS. 7A and 7B later herein) or be substantially extended beyond the end of the fixed component 202 as shown albeit where the movable component 204 is still held in line with the fixed component 202. In this fashion, the movable component 204 is a telescoping component and, for certain alternative implementations, the base 140 may comprise multiple telescoping components as opposed to the one shown as movable component 204.

The movable component 204 in a first position relative to and within the fixed component (i.e., "telescopically collapsed") can provide a minimum leg length, whereas the movable component 204 in a second position relative to and most outside of the fixed component (i.e., "telescopically extended") can provide a maximum leg length (such as shown in FIGS. 1-4), the maximum leg length being greater than the minimum leg length. Moreover, when the legs are in the first position of minimum length, the plurality of legs may be confined beneath and within the lateral circumference of the receptacle (and thus not visible when viewed from above), whereas when the legs are in the second position of maximum length, the plurality of legs may extend beyond the lateral circumference of the receptacle and, of particular note, increase the size of the support footprint for the container-suspension system 100 to prevent suspended item(s) from tipping over the container-suspension system (discussed in more detail below).

In addition, each leg 142, 144 may further comprise a plurality of contact points 206, 208, and 210 for contact with a flat surface upon which the container-suspension system 100 is set. These contact points may differ in position and orientation. For example, a contact point 206 capped on the terminal end of a movable component 204 may need to have a larger vertical (or radial) thickness to compensate for the smaller vertical (radial) thickness of the movable component 204 compared to the thicker fixed component 202. Similarly, a contact point 208 may be shared by more than one leg 142, 144 where the proximate ends of the fixed components 202 of such legs come together as shown in FIG. 4.

To achieve stability for the container-suspension system 100 when the extension 120 is suspending an item or items (such as a hand of bananas), and to prevent tipping over even when the receptacle 110 is empty, the legs in the second position must be extended far enough to create a "support footprint" within which lies the suspension center of gravity for the item suspended by the vertical extension. A support footprint for the base 140 is defined as the area in the lateral plane that is outlined by the contact points 206, 208, and 210 of the legs 142 and 144. As known and appreciated by skilled artisans, as long as the center of gravity for the container-suspension system 100 lies laterally within the area defined by the contact points 206, 208, and 210, the container-suspension system 100 will remain upright and not tip over. Furthermore, as also known and appreciated by skilled artisans, the center of gravity for a suspended item or items at rest (such as the hand of bananas 12 shown in FIG. 1) will be centered at the point of the suspension contact 124, and thus even if the suspended item(s) partially extend beyond the support footprint, the suspended items will not cause the container-suspension system 100 to tip over as long as the center of gravity for the suspended item(s) is laterally located within the support footprint.

For certain implementations, the movable components 204 of each leg 142, 144 may also be oriented into positions of intermediate leg length that are less than the maximum leg length but greater than the minimum leg length (such as shown in FIGS. 7A and 7B). As such, an unloaded center of gravity for the container-suspension system 100 (that is, the center of gravity for the container-suspension system 100 when not being utilized such that the receptacle 110 is empty and nothing is being suspended by the vertical extension 120) may still lie within the support footprint provided by the legs 142, 144 when in such an intermediary position (even if not when in the minimum length configuration).

As further shown in FIGS. 1-4, the vertical extension 120 is coupled to the receptacle 110 via a coupling column 132. For certain implementations, the vertical extension 120 may be removable from the coupling column 132, may be unremovable but turnable (able to be reoriented) with the coupling column 132, or may be fixedly coupled within the coupling column 132. Alternately, the vertical extension may be directly coupled to the receptacle 110, the base 140, or both without any coupling column 132.

The vertical extension 120 comprises an extension arm 122 distally ending in a suspension contact 124 from which extends a suspension component such as the suspension component 130 shown in FIGS. 1-2 (and described in more detail later herein with reference to FIGS. 11-15). As shown, the vertical extension 120 is capable of suspending at least one item (such as a hand of bananas, a bunch of grapes, etc.) in a position other than directly above the receptacle, that is, to one first side of the receptacle. Moreover, although the extension arm 122 and suspension contact 124 are shown as curved and looped respectively in FIGS. 1-4, these features may be manifested in any of several non-limiting alternatives including, for example, as straight vertical and horizontal components meeting at a right angle for the extension arm 122 and as any form of attachment for the suspension contact 124 (e.g., screw, pin, magnet, hook, etc.).

Figure 5A:
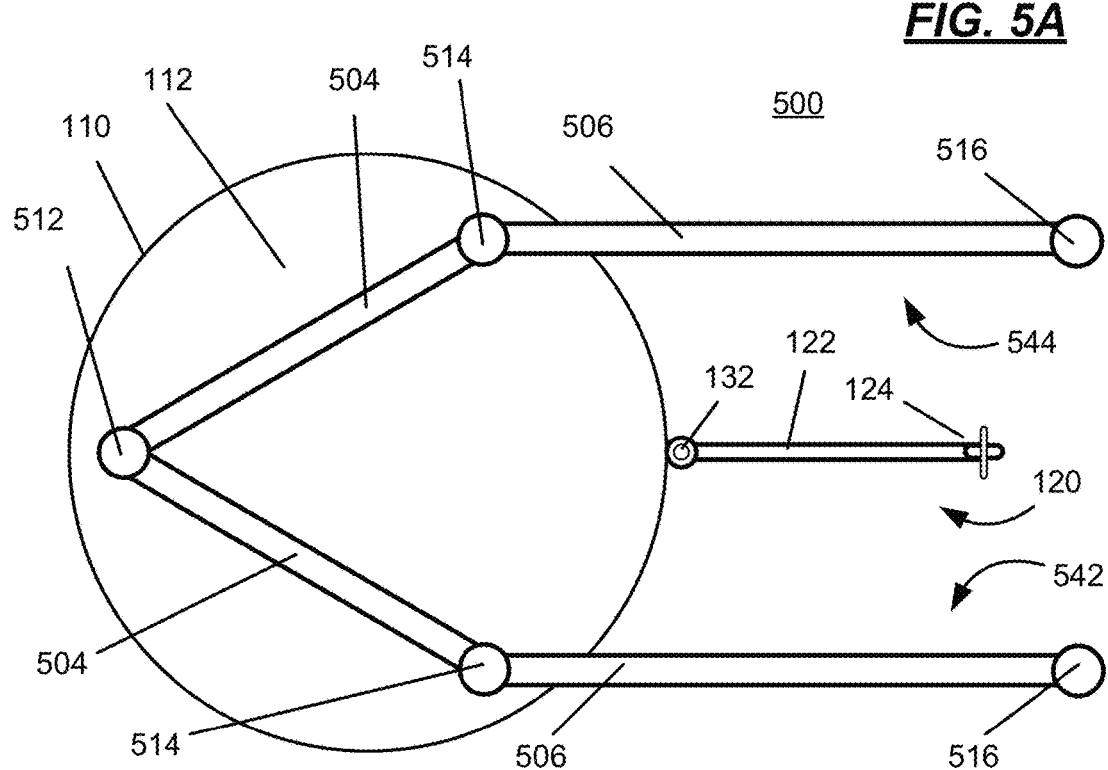
FIG. 5A is a bottom view of an exemplary container-suspension system featuring an alternative arrangement of the support legs that is representative of several implementations disclosed herein.

FIG. 5A is a bottom view of an exemplary container-suspension system 500 featuring an alternative arrangement of the support legs 542, 544 that is representative of several implementations disclosed herein. In FIG. 5A, each leg 542, 544 comprises segments 504, 506 and contact points 512, 514, and 516. Specifically, each leg comprises a straight base segment 504 coupled to a straight extended segment 506. As shown, contact points 512, 514 may form an equilateral triangle arrangement center under the receptacle 110, and the extended segments 506 may run parallel to each other at a distance apart from each other less than the diameter of the receptacle 110.

Figure 5B:
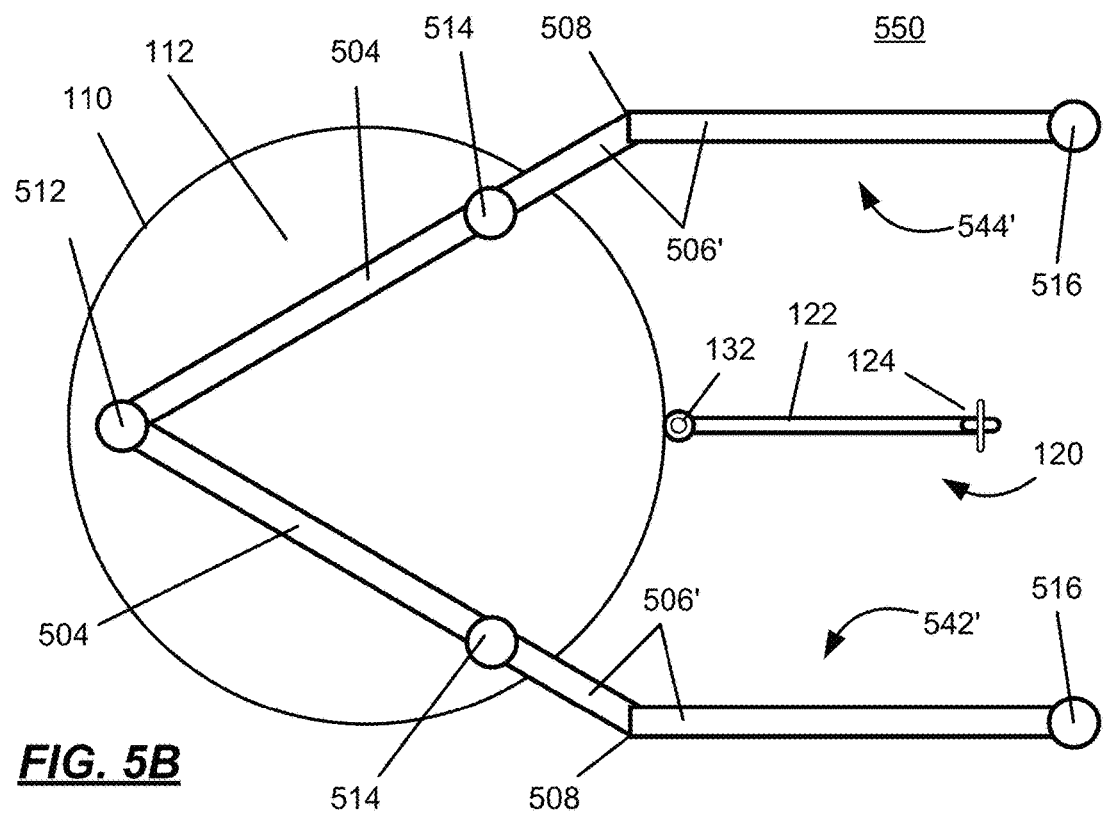
FIG. 5B is a bottom view of an exemplary container-suspension system featuring another alternative arrangement of the support legs that is also representative of certain implementations disclosed herein.

FIG. 5B is a bottom view of an exemplary container-suspension system 550 featuring another alternative arrangement of the support legs that is also representative of certain implementations disclosed herein. In FIG. 5B, each leg 542', 544' comprises segments 504, 506' and contact points 512, 514, and 516. Specifically, each leg comprises a straight base segment 504 coupled to a bent or curved 508 extended segment 506'. As shown, contact points 512, 514 may still form an equilateral triangle arrangement center under the receptacle 110, and the extended segments 506' may have portions that run parallel to each other at a distance apart from each other equal to or greater than the diameter of the receptacle 110 providing a larger support footprint than the container-suspension system 500 of FIG. 5A.

FIG. 6 is a top view of an exemplary container-suspension system 100 featuring an alternative arrangement of the vertical extension 620 that is representative of several implementations disclosed herein. In FIG. 6, the vertical extension 620 comprises two extension arms 622, each of which is coupled to the receptacle 110 via a pair of coupling columns 632 fixedly attached to the receptacle 110. Both extension arms 622 then converge at a shared suspension contact 624 from which extends a suspension component such as the suspension component 130 shown in FIGS. 1-2 (and described in more detail later herein with reference to FIGS. 11-15). Although the extension arms 622 and suspension contact 624 are shown as curved and looped respectively in FIGS. 1-4, these features may be manifested in any of several non-limiting alternatives including, for example, as straight vertical and horizontal components meeting at a right angle for the extension arms 622 and as any form of attachment for the suspension contact 624 (e.g., screw, pin, magnet, hook, etc.).

FIG. 7A is a top view of the exemplary container-suspension system 100 of FIG. 1 featuring a reversible vertical extension 120 in an in-bound position that is representative of certain implementations disclosed herein. FIG. 7B is a side view of the exemplary container-suspension system 100 of FIG. 7A illustrating the reversible vertical extension 120 in the in-bound position representative of certain implementations disclosed herein.

As shown in FIGS. 7A and 7B, the vertical extension 120 is coupled to the receptacle 110 via a coupling column 132 but reversed such that the suspension contact 124—from which extends a suspension component such as the suspension component 130 shown in FIGS. 1-2 (and described in more detail later herein with reference to FIGS. 11-15)—is located above and over the interior surface 116 of the receptacle 110. Furthermore, the legs 142 and 144 are shown in these figures in an intermediary position less than the maximum length but greater than the minimum length. When nothing is suspended, this configuration might be used for storing the container-suspension system 100 or for reducing the support footprint (which, in turn, reduces the space taken up by the container-suspension system on the flat surface on which it is set).

Nevertheless, the reversed vertical extension 120 is still capable of suspending at least one item (such as a hand of bananas, a bunch of grapes, etc.) in a position directly above the receptacle 110, and thus certain implementation thereof may utilize an oxidizer (not shown) in the receptacle for neutralizing ethylene gas originating from fruit stored in the receptacle 110. For example, potassium permanganate is an oxidizing agent that may be used as such an oxidizer in order to inhibit the ripening of a suspended set of bananas by oxidizing the ethylene gas that is generated by fruit stored in the receptacle 110.

FIG. 8 is a side view of an exemplary container-suspension system 800 featuring a wire-type receptacle 810, in lieu of the solid receptacle shown in FIG. 1, that is representative of several implementations disclosed herein. In FIG. 8, the receptacle 810 is constructed of interspersed wires 812 forming a bowl shape for containing items but permitting greater airflow and greater visibility of the content contained within said receptacle 810.

Figure 9:
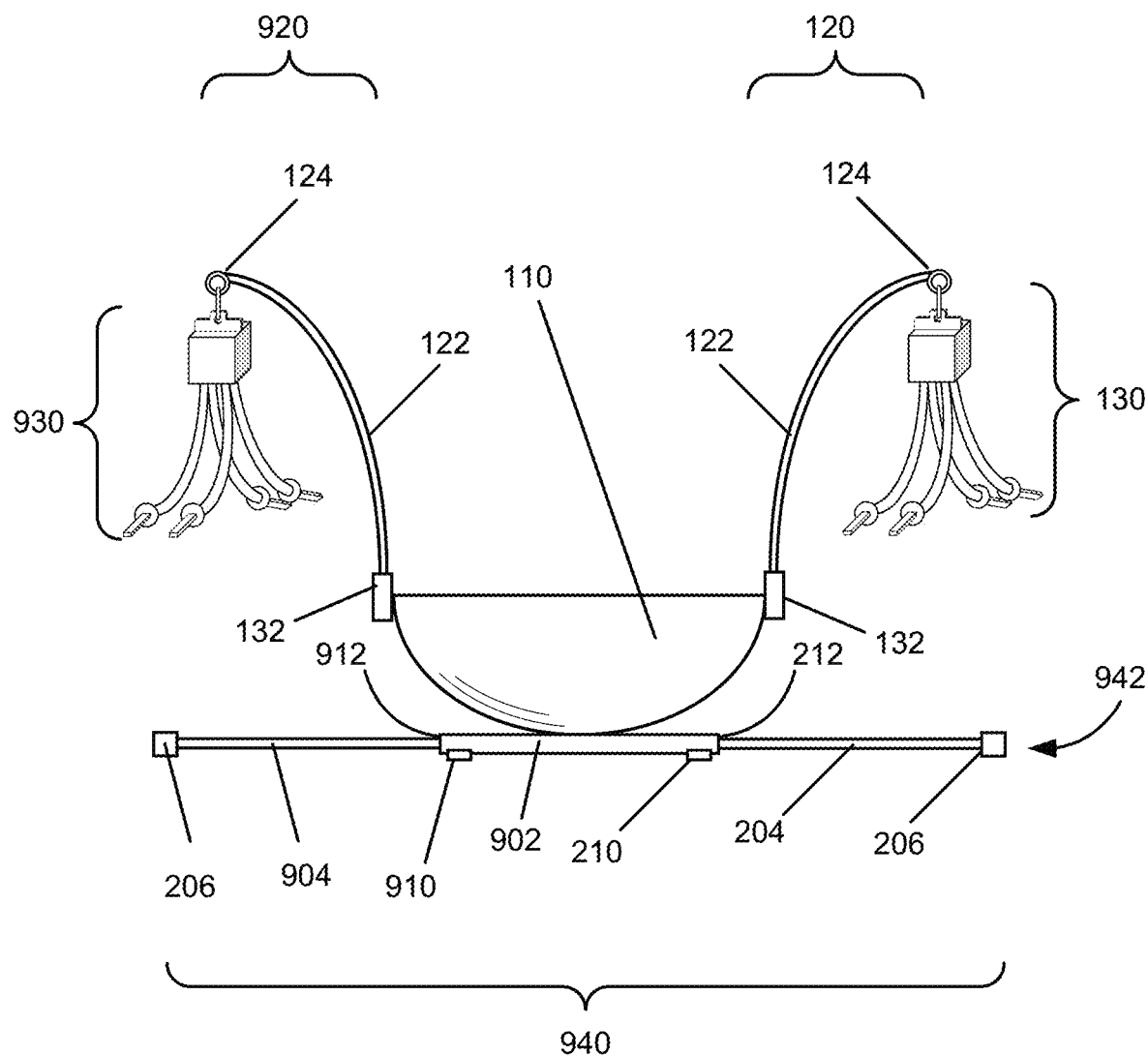
FIG. 9 is a side view of an exemplary container-suspension system featuring a plurality of suspension structures and an enhanced arrangement of support legs representative of several alternative implementations disclosed herein.

FIG. 9 is a side view of an exemplary container-suspension system 900 featuring a plurality of suspension structures 130, 930 and an enhanced arrangement of support legs 940 representative of several alternative implementations disclosed herein. In FIG. 9, a mirrored extension 920 is coupled to the receptacle 110 opposite the vertical extension 120, wherein said mirrored extension 920 is capable of suspending at least one item in a position other than directly above the receptacle 110. The mirrored extension 920 is coupled to the receptacle 110 (or the base, or both) opposite of the vertical extension 120 such that, when a first item is suspended by the vertical extension 120 and a second item of equal weight is suspended by the mirrored extension 920, the first item and second item cancel out each other with regard to the unloaded center of gravity.

The container-suspension system 900 of FIG. 9 may also comprise a base 940 comprising a plurality of legs 942 each comprising a fixed component 902 fixedly coupled to the receptacle 110 and two movable components 204, 904 operationally coupled to the fixed component 902. As shown, the fixed component 902 may be hollow and open at each end 212, 912 to enable movable component 204, 904 to slide into and reside substantially within the fixed component 902 or be substantially extended beyond the end of the fixed component 902 as shown albeit where the movable components 204, 904 are still held in line with the fixed component 902. In this fashion, the movable components 204, 904 are each a telescoping component and, for certain alternative implementations, the base 940 may comprise multiple telescoping components on each end as opposed to the single telescoping component on each end shown as movable components 204, 904 in the illustration.

Figure 10:
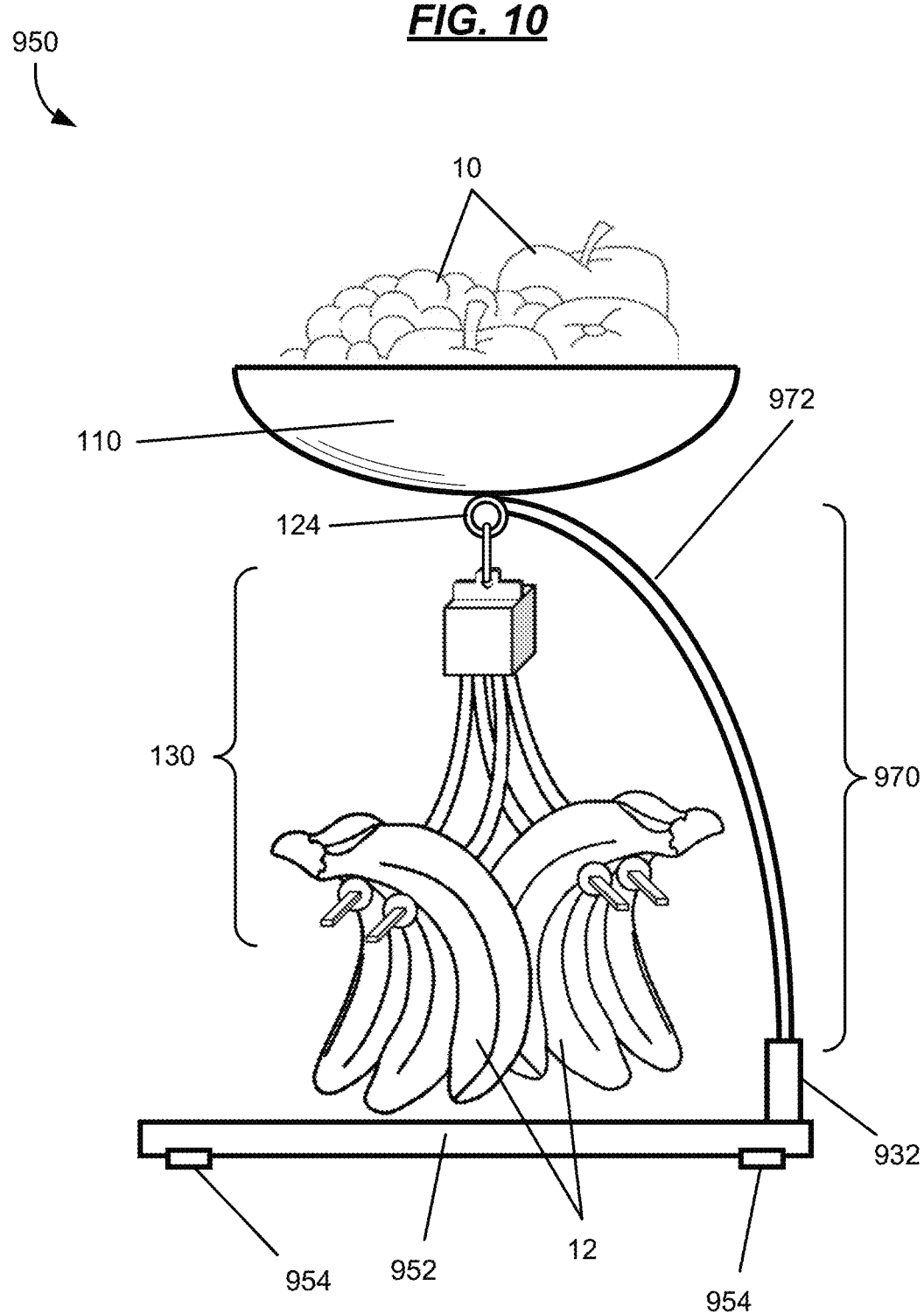
FIG. 10 is a side view of an exemplary container-suspension system featuring a receptacle emplaced above a suspension structure representative of certain alternative implementations disclosed herein.

FIG. 10 is a side view of an exemplary container-suspension system 950 featuring a receptacle 110 emplaced above a suspension structure 970 representative of certain alternative implementations disclosed herein. In FIG. 10, the suspension structure 970 is fixedly coupled to a platform base 952 comprising a plurality of contacts 954 for engaging a flat surface and a platform coupling 932 for coupling with the suspension structure 970. Other such arrangements and alternatives are also encompassed by these disclosures.

The various container-suspension systems illustrated in FIGS. 1-10 may feature a dynamic, tactile, and manipulable non-piercing suspension apparatus 130.

Figure 11:
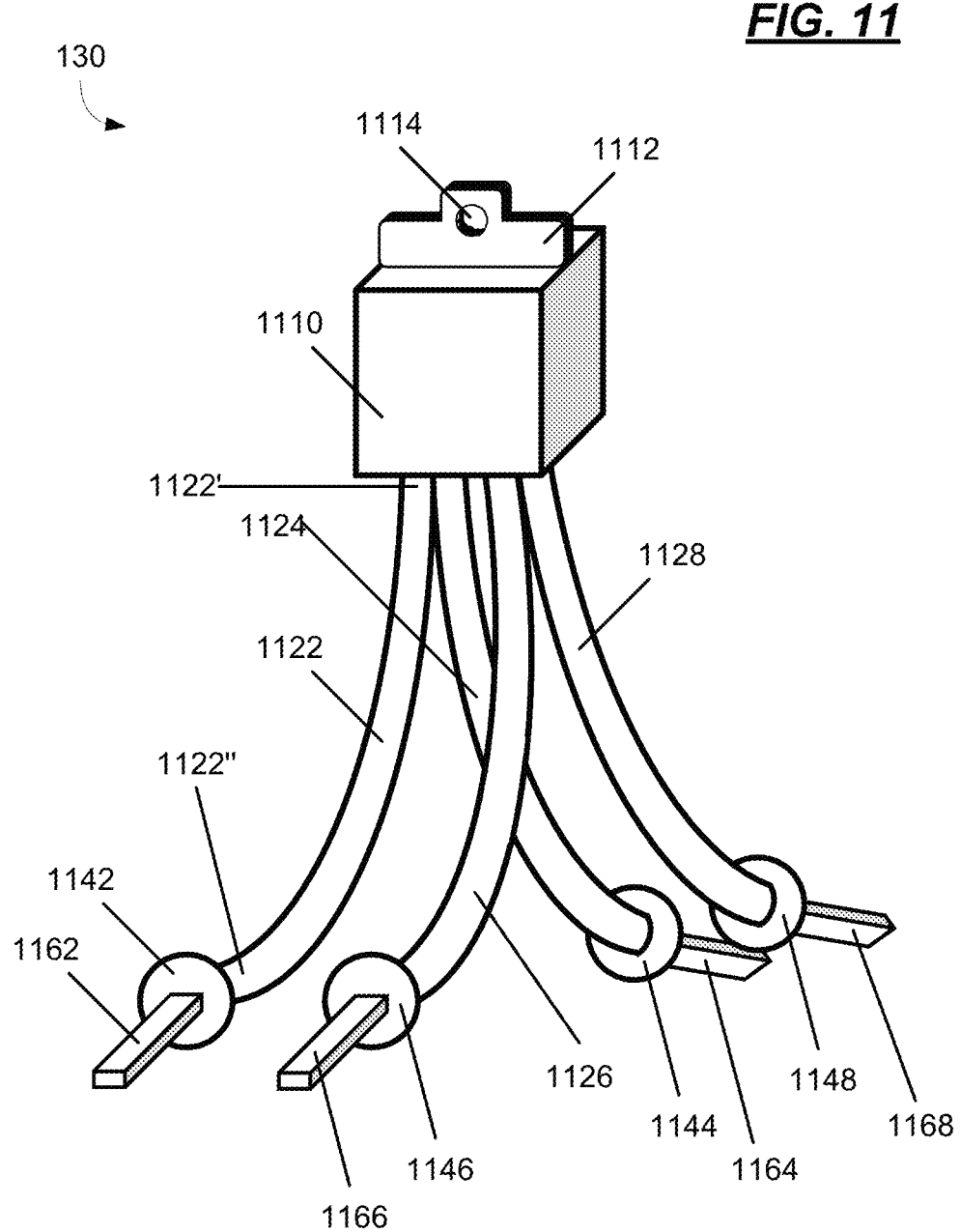
FIG. 11 is a three-dimensional perspective view of an exemplary suspension component featured by the various implementations shown in FIGS. 1-10 that is representative of various implementations disclosed herein.

FIG. 11 is a three-dimensional perspective view of an exemplary suspension apparatus 130 representative of various implementations disclosed herein. In the figure, the suspension apparatus 130 comprises an integration housing 1110, an anchor engagement 1112 coupled to the upper side of an integration housing 1110, and one or more suspension strands 1122, 1124, 1126, 1128 coupled to the lower side of the integration housing 1110. The anchor engagement 1112 may feature an engagement feature 1114 for operably coupling to any of various anchor points. The one or more suspension strands 1122, 1124, 1126, 1128 extend generally downward from integration housing 1110. For several implementations, an upper end (e.g., 1122') of each suspension strand 1122, 1124, 1126, 1128 is the portion that is affixedly coupled to the integration housing 1110 while a lower end (e.g., 1122") of each suspension strand is affixedly coupled to a suspension contact 1142, 1144, 1146, 1148.

The suspension contacts 1142, 1144, 1146, 1148, in turn, may be each affixedly coupled to an extension tab 1162, 1164, 1166, 1168. For several such implementations, these extension tabs (a) may be coupled to a suspension contact opposite a second end of a corresponding suspension strand coupled to such suspension contact, (b) may comprise flexible or elastic, or flexible and elastic, material or materials, and/or (c) may be thinner than the corresponding suspension contact to which said extension tab is coupled to allow for easy insertion between adjacent fingers in a hand. Likewise, for various implementations each of the suspension strands may comprise flexible or elastic, or flexible and elastic, material or materials, and/or each of the suspension contacts may comprise a contact surface lacking points (e.g., corners) and lacking edges which are more likely to damage and bruise bananas. Similarly, each of the extension tabs may comprise a contact surface lacking points (e.g., corners) and lacking edges (not shown). Additionally, (1) the suspension strands 1122, 1124, 1126, 1128 and suspension contacts 1142, 1144, 1146, 1148 may exhibit, to varying degrees, a "tactile" characteristic in the sense of providing at least a de minimis friction (or "grip") when in contact with any part of a target item such as a banana, and/or (2) the suspension strands 1122, 1124, 1126, 1128 may exhibit, to varying degrees, a "manipulable" characteristic in the sense of being twisting, stretchable, shapeable, and knotable, these features being potentially encompassed by any of the various implementations disclosed herein.

Several implementations may utilize pairs of suspension strands, each pair of suspension strands may be formed from a single material strand having an intervening portion that passes in and is retained within the integration housing, a first portion commencing from a first endpoint of the intervening portion, the first portion extending downward from and outside of the integration housing to form a first strand of the pair of strands, and a second portion commencing from a second endpoint of the intervening portion opposite the first endpoint, the second portion extending downward from and outside of the integration housing to form a second strand of the pair of strands. For certain implementations, the intervening portion is immovably fixed within the integration housing.

Regarding the anchor engagement 1112, several implementations may feature: operably coupling the engagement feature to an anchoring mechanism in order to suspend the apparatus comprising the engagement housing and the one or more suspension strands, wherein the suspended apparatus is capable of suspending at least one target item. Select implementations may utilize an anchor engagement that is integrated-by-manufacture into a first portion of the integration housing such that the anchor engagement is physically inseparable from, or in one piece with, the first portion of the integration housing.

The anchoring mechanism may take several different forms, such as an under-edge mounting mechanism, a shelf mounting mechanism, an eye screw, an eye bolt, a wire rod, an S-mount, and a fixed hook, among other options and configurations.

FIG. 12A is a three-dimensional perspective view illustrating a single suspension strand 1122 of the exemplary suspension apparatus 130 of FIG. 11 being utilized to suspend a single banana 1200 (having a simple stem 1200" and a complex stem 1200') using a single tactile and manipulable twist of the lower end 1122" of the single suspension strand 1122 in a manner representative of various implementations disclosed herein. FIG. 12B is a three-dimensional perspective view illustrating a pair of suspension strands 1122, 1124 of the exemplary suspension apparatus 130 of FIG. 11 being utilized to suspend a single banana 1200 using a single overhand twist of the lower ends 1122", 1124" of the pair of suspension strands 1122, 1124 in a manner representative of various implementations disclosed herein. FIG. 12C is a three-dimensional perspective view of a single banana 1250 (having a simple stem 1250" but no complex stem) that may also be suspended from the single suspension strand 1122 illustrated in FIG. 12A (by utilizing a single overhand knot), as well as from the pair of suspension strands 1122, 1124 illustrated in FIG. 12B (by utilizing the one of the two gaps created by the crossing of the two suspension strands 1122", 1124"), both in a manner representative of various implementations disclosed herein.

FIG. 13 is a three-dimensional perspective view of the exemplary suspension apparatus 130 of FIG. 11 further illustrating a single hand of bananas 1300 suspended from two suspension strands 1122, 1126 representative of various implementations disclosed herein. As illustrated in the Figure, a first suspension strand 1122 is positioned between a first finger 1302 and a second finger 1304 of the hand 1300 proximate to the complex stem 1300', while a second suspension strand 1126 is positioned between the second finger 1304 and a third finger 1306 of the hand 1300, also proximate to the complex stem 1300'. In this fashion, where a hand of bananas 300 is suspended by at least two suspension strands 1122, 1126 each with coupled suspension contacts 1142, 1146, the two suspension strands 1122, 1126 each bear a portion of a total suspension weight corresponding to the hand of bananas, thereby distributing the pressure each suspension contact 1142, 1146 exerts on the individual fingers 1302, 1304, 1306 and, as a result, minimizing bruising. Bruising is further mitigated when each suspension strand 1122, 1126 and/or each suspension contact 1142, 1146 features a soft surface (cloth and the like, typical of flexible materials) versus a hard surface (such as metal, typical of a hook). Notably, when the suspended hand of bananas comprises at least three fingers, at least one finger can be removed from the hand without repositioning at least one suspension strand (and corresponding suspension contact) which remains capable of suspending the hand of bananas after said removal.

Figure 14:
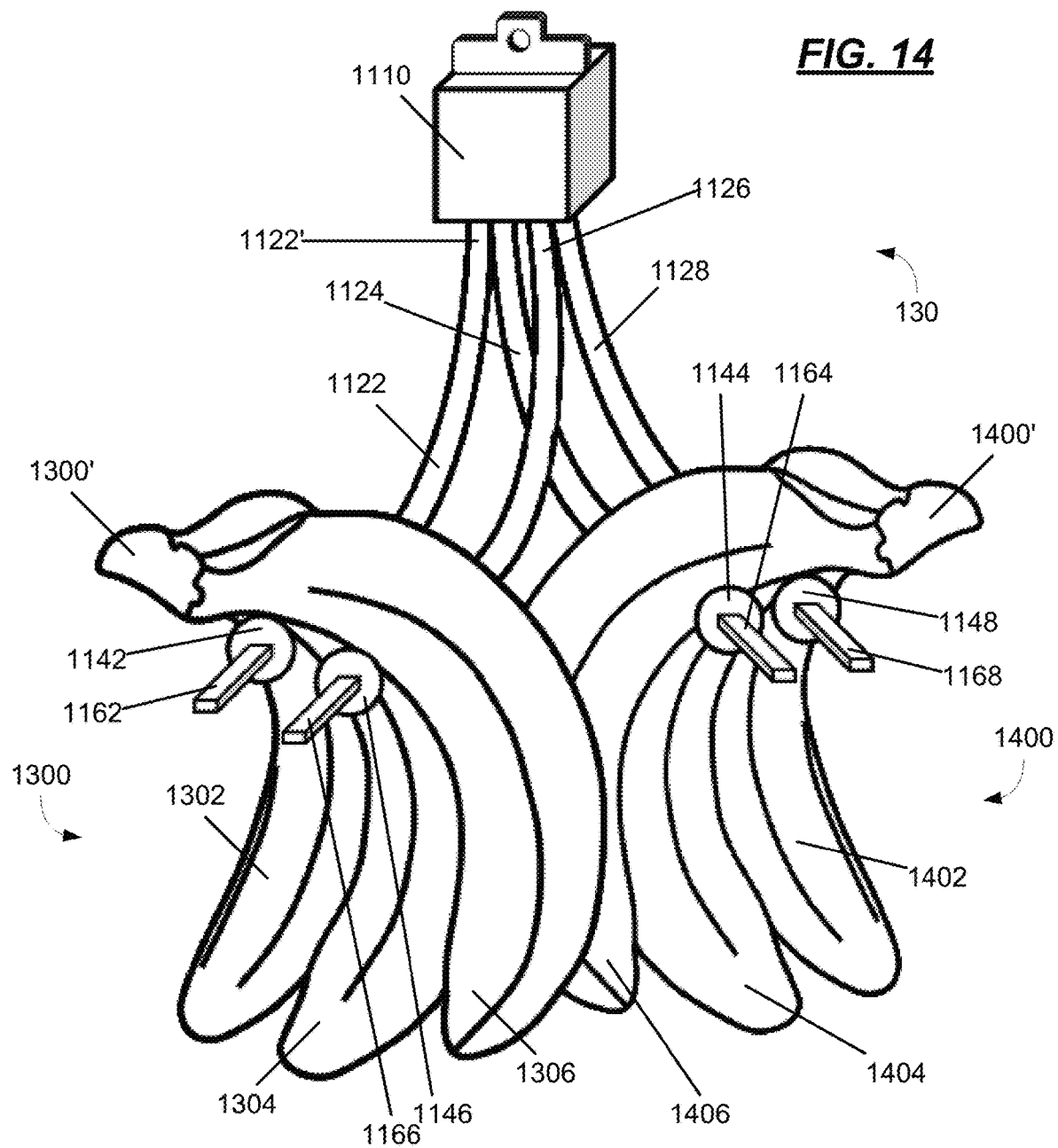
FIG. 14 is a three-dimensional perspective view of the exemplary dynamic TSS of FIG. 11 further illustrating two hands of bananas suspended from four suspension strands representative of various implementations disclosed herein.

FIG. 14 is a three-dimensional perspective view of the suspension apparatus 130 of FIG. 11 further illustrating two hands of bananas 1300, 1400 suspended from four suspension strands 1122, 1124, 1126, and 1128 representative of various implementations disclosed herein. Notably, each hand 1300, 1400 is suspended by at least two suspension strands 1122, 1124, 1126, 1128 each with coupled suspension contacts 1142, 1144, 1146, 1148, and all four suspension strands 1122, 1124, 1126, 1128 each bear a portion of a total suspension weight corresponding to their respective hand of bananas 1300, 1400 thereby distributing the pressure each suspension contact 1142, 1144, 1146, 1148 located proximal to the respective complex stems 1300' and 1400' exerts on the individual fingers 1302, 1304, 1306, 1402, 1404, 1406. Also notable is that each suspension strand 1122, 1124, 1126, 1128 with coupled suspension contact 1142, 1144, 1146, 1148 is each capable of simultaneously suspending a hand of bananas (for a total of four hands being suspended (not shown) albeit without the benefits of distributing weight among more than one suspension strand.

Figure 15:
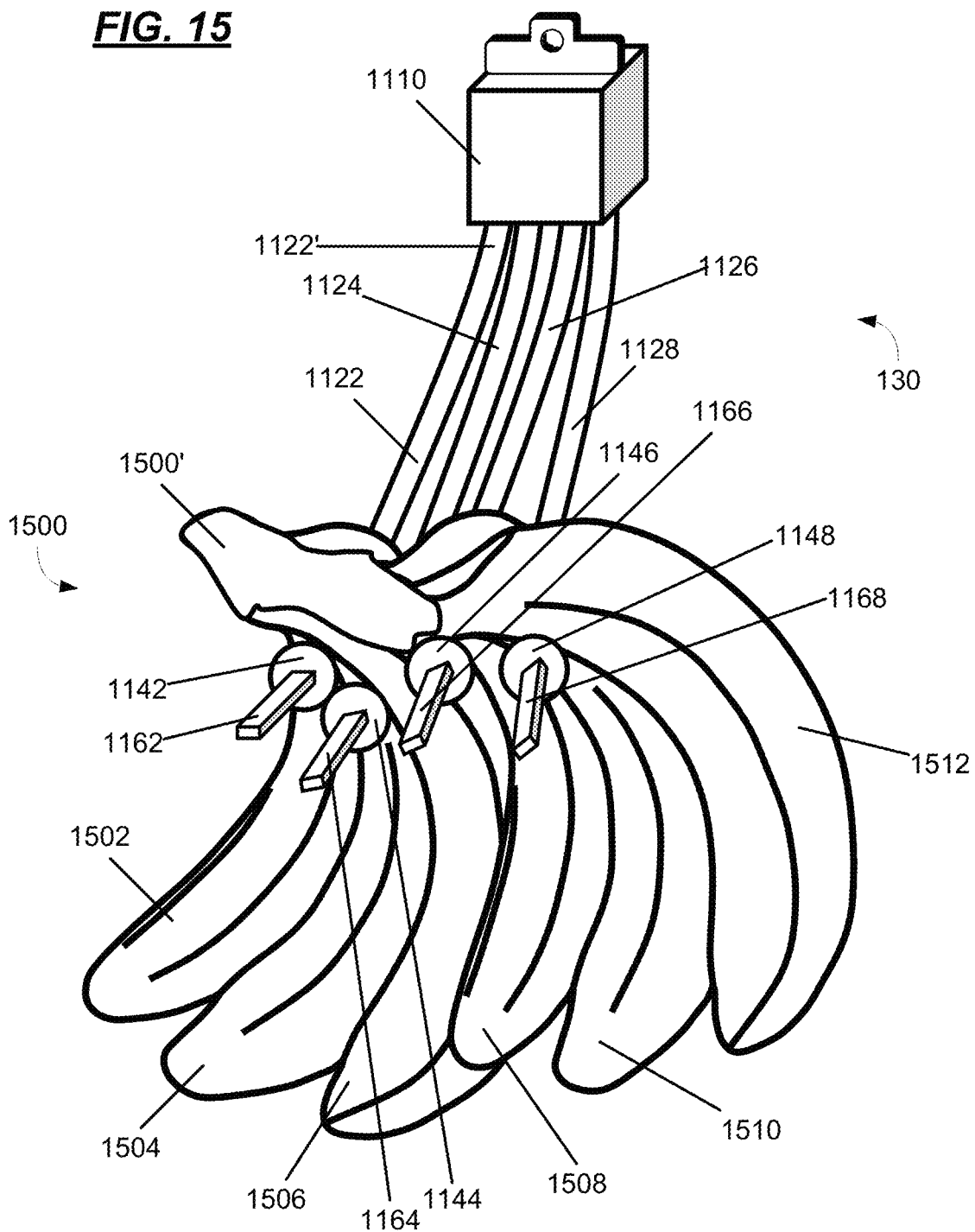
FIG. 15 is a three-dimensional perspective view of the exemplary dynamic TSS of FIG. 11 further illustrating a single large hand of bananas suspended from four suspension strands representative of various implementations disclosed herein.

FIG. 15 is a three-dimensional perspective view of the exemplary suspension apparatus 130 of FIG. 11 further illustrating a single large hand of bananas 1500 suspended from four suspension strands 1122, 1124, 1126, and 1128 representative of various implementations disclosed herein. As illustrated in FIG. 15, all four suspension strands 1122, 1124, 1126, and 1128 are inserted in different gaps between adjacent fingers 1502, 1504, 1506, 1508, 1510, 1512 coupled to the single complex stem 1500' of the hand 1500. Thus, up to four of the six bananas are capable of being removed from the hand of bananas without repositioning at least one suspension strand (and corresponding suspension contact) which remains capable of suspending the hand of remaining bananas after said removal.

Various implementations of the suspension apparatus 130 may feature an integration housing comprising at least one anchor engagement for use in suspending the anchor housing; one or more suspension strands, each suspension strand comprising a first end and a second end opposite the first end, the first end of each suspension strand coupled to the integration housing; and one or more suspension contacts, each suspension contact coupled to the second end of a suspension strand from among the one or more suspension strands, the suspension strand and coupled suspension contact being capable of (1) suspending a hand of bananas in a first use without piercing the hand of bananas and (2) suspending a single banana in a second use without piercing the single banana, even when the single banana comprises a simple stem but lacks a complex stem, by using, for example, a suspension strand that is knotable as described. Notably, each suspension strand with coupled suspension contact is capable of individually and simultaneously suspending a hand of bananas.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims. Moreover, the phrase "based on" does not mean "based only on," unless expressly specified otherwise. In other words, the phrase "based on" describes both "based only on" and "based at least on," or, if supported by the context, "based permissibly on."

Moreover, the flowcharts, block diagrams, and other structures shown and described herein are examples only, and other variants of these structures are also within the scope of the disclosure. Various modifications to these configurations are possible, and the generic principles presented herein may be applied to other configurations as well. Thus, the present disclosure is not intended to be limited to the configurations shown above but rather is to be accorded the widest scope consistent with the principles and novel features disclosed in any fashion herein, including in the attached claims as filed, which form a part of the original disclosure. As such, it should be noted that one or more of the features, functions, procedures, components, elements, structures, etc., described in connection with any one of the configurations, implementations, examples, or embodiments described herein may be combined with one or more of the functions, procedures, components, elements, structures, etc., described in connection with any of the other configurations, implementations, examples, or embodiments described herein, where compatible. In other words, any compatible combination of the functions, procedures, components, elements, etc., described herein may be implemented in accordance with the systems and methods disclosed herein.

Furthermore, unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose."

Any incorporation by reference of a portion of a document shall also be understood to incorporate definitions of terms or variables that are referenced within the portion, where such definitions appear elsewhere in the document, as well as any figures referenced in the incorporated portion. Unless initially introduced by a definite article, an ordinal term (e.g., "first," "second," "third," etc.) used to modify a claim element does not by itself indicate any priority or order of the claim element with respect to another, but rather merely distinguishes the claim element from another claim element having a same name (but for use of the ordinal term). Unless expressly limited by its context, each of the terms "plurality" and "set" is used herein to indicate an integer quantity that is greater than one, whereas the term "subset" is used herein to indicate an integer quantity that is greater than or equal to one. Furthermore, in the above description reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular figure.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein. Furthermore, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims that follow.

What is claimed:

1. An apparatus comprising:
    a receptacle capable of containing a plurality of items;
    a base coupled to the receptacle for stable placement of the apparatus on a flat surface; and
    a vertical extension coupled to the receptacle, the base, or both, wherein said vertical extension is capable of suspending at least one item in a position other than directly above the receptacle;
    wherein the base comprises at least two base legs that are oriented in a manner to provide stable placement of the apparatus on a flat surface when the extension is suspending the at least one item and when the receptacle is empty, wherein the vertical extension is capable of suspending at least one item to a first side of the receptacle, and wherein each leg from among the at least two base legs further comprises:
        a fixed component fixedly coupled to the receptacle, and
        a movable component operationally coupled to the fixed component that in a first position relative to the fixed component provides a minimum leg length and in a second position relative to the fixed component provides a maximum leg length, the maximum leg length being greater than the minimum leg length.

2. The apparatus of claim 1, wherein:
    when each leg from among the at least two base legs is in the first position, the plurality of legs are confined beneath and within the lateral circumference of the receptacle; and
    when each leg from among the at least two base legs is in the second position, the plurality of legs extend beyond the lateral circumference of the receptacle.

3. The apparatus of claim 2, wherein a suspension center of gravity for the item suspended by the vertical extension lies within a support footprint provided by the at least two base legs when each leg from among the at least two base legs is in the second position.

4. The apparatus of claim 3, wherein the movable component of each leg of the at least two base legs in a third position relative to the fixed component provides an intermediate leg length less than the maximum leg length and greater than the minimum leg length such that an unloaded center of gravity for the apparatus, when the receptacle and vertical extension are not utilized, lies within a support footprint provided by the at least two base legs when in the third position.

5. The apparatus of claim 4, further comprising a mirrored extension coupled to the receptacle, the base, or both, wherein said mirrored extension is capable of suspending at least one item in a position other than directly above the receptacle.

6. The apparatus of claim 5, wherein the mirrored extension is coupled to the receptacle, the base, or both in a manner opposite of the vertical extension such that, when a first item is suspended by the vertical extension and a second item of equal weight is suspended by the mirrored extension, the first item and second item cancel out each other with regard to the unloaded center of gravity.

7. The apparatus of claim 4, wherein the vertical extension is movably coupled to the receptacle, the base, or both, such that said vertical extension is capable of suspending at least one item in a position other than directly above the receptacle in a first orientation and is capable of suspending at least one item in a position directly above the receptacle in a second orientation.

8. The apparatus of claim 7, wherein the receptacle further comprises an oxidizer for neutralizing ethylene gas originating in the receptacle.

9. The apparatus of claim 4, wherein the vertical extension further comprises a suspension component, the suspension component comprising:
    one or more suspension strands, each suspension strand comprising a first end and a second end opposite the first end, the first end of each suspension strand operationally coupled to the vertical extension such that each suspension strand extends from the vertical extension; and
    one or more suspension contacts, each suspension contact coupled to the second end of a suspension strand from among the one or more suspension strands.

10. The apparatus of claim 9, wherein each suspension strand and its coupled suspension contact are capable of:
    suspending a hand of bananas in a first use without piercing the hand of bananas; and
    suspending a single banana in a second use without piercing the single banana.

11. The apparatus of claim 9, wherein each suspension strand with coupled suspension contact is capable of simultaneously suspending a hand of bananas.

12. The apparatus of claim 9, wherein the suspended hand of bananas comprises at least three fingers, and wherein at least one finger from among the at least three fingers is capable of being removed from the hand of bananas without repositioning at least one suspension strand and corresponding suspension contact which remains capable of suspending the hand of bananas after said removal.

13. The apparatus of claim 9, wherein a hand of bananas is capable of being suspended by at least two suspension strands, where each suspension strand from among the at least two suspension strands bears a portion of a total suspension weight corresponding to the hand of bananas.

14. An apparatus comprising:
a receptacle capable of containing a plurality of items;
a base coupled to the receptacle for stable placement of the apparatus on a flat surface;
a vertical extension coupled to the receptacle, the base, or both, wherein said vertical extension is capable of suspending at least one item in a position other than directly above the receptacle; and
a suspension component operationally coupled to the vertical extension, the suspension component comprising:
one or more suspension strands, each suspension strand comprising a first end and a second end opposite the first end, the first end of each suspension strand operationally coupled to the vertical extension such that each suspension strand extends from the vertical extension, and
one or more suspension contacts, each suspension contact coupled to the second end of a suspension strand from among the one or more suspension strands;
wherein each suspension strand and its coupled suspension contact are capable of suspending a hand of bananas in a first use without piercing the hand of bananas, and suspending a single banana in a second use without piercing the single banana.

15. The apparatus of claim 14, wherein the base comprises at least two base legs that are oriented in a manner to provide stable placement of the apparatus on a flat surface when the extension is suspending the at least one item and when the receptacle is empty, and wherein at least one leg from among the at least two base legs further comprises:
a fixed component fixedly coupled to the receptacle; and
a movable component operationally coupled to the fixed component that in a first position relative to the fixed component provides a minimum leg length and in a second position relative to the fixed component provides a maximum leg length, the maximum leg length being greater than the minimum leg length.

16. The apparatus of claim 15, wherein the vertical extension is movably coupled to the receptacle, the base, or both, such that said vertical extension is capable of suspending at least one item in a position other than directly above the receptacle in a first orientation and is capable of suspending at least one item in a position directly above the receptacle in a second orientation.

17. An apparatus comprising:
a receptacle capable of containing a plurality of items;
a vertical extension coupled to the receptacle wherein said vertical extension is capable of suspending at least one item in a position other than directly above the receptacle;
a suspension component operationally coupled to the vertical extension, the suspension component comprising:
one or more suspension strands, each suspension strand comprising a first end and a second end opposite the first end, the first end of each suspension strand operationally coupled to the vertical extension such that each suspension strand extends from the vertical extension, and
one or more suspension contacts, each suspension contact coupled to the second end of a suspension strand from among the one or more suspension strands, each suspension strand and its coupled suspension contact being capable of suspending a hand of bananas in a first use without piercing the hand of bananas and suspending a single banana in a second use without piercing the single banana; and
a base coupled to the receptacle for stable placement of the apparatus on a flat surface, the base comprising at least two base legs extending beyond the lateral circumference of the receptacle and wherein a suspension center of gravity for an item suspended by the vertical extension lies within a support footprint provided by the at least two base legs.

* * * * *